US007679555B2

(12) United States Patent
Dai et al.

(10) Patent No.: US 7,679,555 B2
(45) Date of Patent: Mar. 16, 2010

(54) NAVIGATION RECEIVER AND METHOD FOR COMBINED USE OF A STANDARD RTK SYSTEM AND A GLOBAL CARRIER-PHASE DIFFERENTIAL POSITIONING SYSTEM

(75) Inventors: Liwen L. Dai, Chino Hills, CA (US); Chaochao Wang, Los Angeles, CA (US); Daniel J. Eslinger, Huntington Beach, CA (US); Ronald R. Hatch, Wilmington, CA (US); Richard T. Sharpe, Torrance, CA (US)

(73) Assignee: Navcom Technology, Inc., Torrance, CA (US)

( * ) Notice: Subject to any disclaimer, the term of this patent is extended or adjusted under 35 U.S.C. 154(b) by 0 days.

(21) Appl. No.: 12/341,969

(22) Filed: Dec. 22, 2008

(65) Prior Publication Data
US 2009/0102708 A1 Apr. 23, 2009

Related U.S. Application Data

(63) Continuation-in-part of application No. 11/345,124, filed on Jan. 31, 2006, now Pat. No. 7,511,661, which is a continuation-in-part of application No. 10/757,340, filed on Jan. 13, 2004, now Pat. No. 7,119,741.

(51) Int. Cl.
*G01S 5/14* (2006.01)
(52) U.S. Cl. .............................. 342/357.03; 342/357.04
(58) Field of Classification Search ............ 342/357.03, 342/357.04
See application file for complete search history.

(56) References Cited

U.S. PATENT DOCUMENTS 4,622,557 A * 11/1986 Westerfield ............ 342/357.09

| 5,359,332 | A | * | 10/1994 | Allison et al. ........ 342/357.04 |
| 5,935,194 | A | | 8/1999 | Talbot et al. ............ 701/214 |
| 6,040,798 | A | | 3/2000 | Kinal et al. ........... 342/357.01 |
| 6,127,968 | A | | 10/2000 | Lu ....................... 342/357.03 |
| 6,469,663 | B1 | | 10/2002 | Whitehead et al. .... 342/357.03 |

(Continued)

FOREIGN PATENT DOCUMENTS

EP    1580570 A2    9/2005

OTHER PUBLICATIONS

M. Min et al., Dynamic accuracy of GPS receivers in citrus orchards, Applied Engineering in Agriculture, vol. 24(6), p. 861-868, Nov. 2008.*

(Continued)

*Primary Examiner*—Thomas H Tarcza
*Assistant Examiner*—Fred H Mull
(74) *Attorney, Agent, or Firm*—Morgan, Lewis & Bockius LLP

(57) ABSTRACT

A mobile satellite navigation receiver for calculating an offset between a local positioning system and a wide-area satellite positioning system is presented. The mobile satellite navigation receiver determines a first solution of a position of the mobile satellite navigation receiver relative to a first local positioning system, wherein the first local positioning system includes one or more reference receivers at known locations. The mobile satellite navigation receiver determines a second solution of the position of the satellite navigation receiver relative to a wide-area differential satellite positioning system. The mobile satellite navigation receiver then calculates an offset between the first solution and the second solution.

29 Claims, 9 Drawing Sheets

U.S. PATENT DOCUMENTS

| | | | |
|---|---|---|---|
| 6,531,981 B1 | 3/2003 | Fuller et al. | 342/357.03 |
| 6,753,810 B1 | 6/2004 | Yang et al. | 342/357.14 |
| 6,792,380 B2 | 9/2004 | Toda | 702/151 |
| 2003/0154049 A1 | 8/2003 | Toda | 702/151 |
| 2005/0024263 A1 | 2/2005 | Sharpe et al. | 342/357.03 |
| 2005/0151683 A1 | 7/2005 | Sharpe et al. | 342/357.04 |
| 2005/0248485 A1 | 11/2005 | Hatch et al. | 342/357.12 |

OTHER PUBLICATIONS

Bona, P., "Precision, Cross Correlation, and Time Correlation of GPS Phase and Code Observations," GPS Solutions, vol. 4, No. 2, pp. 3-13 (2000).

Crawford, S., et al., "Performance Evaluation of Sensor Combinations on Mobile Robots for Automated Platoon Control," ION GNSS $17^{th}$ Int'l Technical Meeting of the Satellite Division, Sep. 21-24, 2004, Long Beach, California, pp. 706-717.

Hatch, R., "Instantaneous Ambiguity Resolution," presented at KIS Symposium 1990, Banff, Canada, Sep. 11, 1990, pp. 1-12.

Hatch, R., "The Synergism of GPS Code and Carrier Measurements," Magnavox Government and Industrial Electronics Company, Jan. 1982, 20 pages.

Hwang, P.Y.C., "Kinematic GPS for Differential Positioning: Resolving Integer Ambiguities on the Fly," Navigation: Journal of the Institute of Navigation, vol. 38, No. 1, pp. 1-15, Spring 1991, pp. 1-15.

Sharpe, T., et al., "Exploiting the Synergies Between RTK and Wide Area, Dual Frequency dGPS Systems," presentation at the Institute of Navigation, 16th International Technical Meeting, Portland, Oregon, Sep. 2003, 29 pages.

Walsh, D., "Real Time Ambiguity Resolution While on the Move," Proceedings of the Institute of Navigation GPS-92, Washington, DC, Sep. 18, 1992, pp. 473-481.

Yang, Y., "Tightly Integrated Attitude Determination Methods for Low-Cost Inertial Navigation: Two-Antenna GPS and GPS/Magnetometer," Dissertation submitted to University of California, Riverside, Jun. 2001, 203 pages.

"Report on Overseas Travel", Sep. 2003, Portland, Oregon, ION 2003 Reports.doc, specifically p. 12, "bullet" item 5, pp. 1-14.

Office Action mailed Mar. 3, 2008 for related U.S. Appl. 11/345,124.

International Search Report for International Patent Application No. PCT/US2004/042374, dated Jun. 1, 2005.

International Search Report for International Application No. PCT/US2007/002514, dated Aug. 22, 2007.

\* cited by examiner

NAVIGATION RECEIVER AND METHOD FOR COMBINED USE OF A STANDARD RTK SYSTEM AND A GLOBAL CARRIER-PHASE DIFFERENTIAL POSITIONING SYSTEM

RELATED APPLICATIONS

This application is a continuation-in-part of U.S. patent application Ser. No. 11/345,124, filed on Jan. 31, 2006 now U.S. Pat. No. 7,511,661, which is a continuation-in-part of U.S. patent application Ser. No. 10/757,340, filed on Jan. 13, 2004, now U.S. Pat. No. 7,119,741, issued Oct. 10, 2006. The contents of each of the aforementioned applications are herein incorporated by reference in its entirety.

TECHNICAL FIELD

The disclosed embodiments relate generally to the combined use of a standard RTK system and a global carrier-phase differential positioning system.

BACKGROUND

The global positioning system (GPS) uses satellites in space to locate objects on earth. GPS uses L-band signals from the satellites, which are tracked by a GPS receiver and used to determine the position of the GPS receiver. Currently, two types of GPS measurements are available within a civilian GPS receiver for each carrier signal of each GPS satellite that is being tracked. The two types of GPS measurements are pseudorange, and integrated carrier phase. These two types of measurements are available on each of two carrier signals, L1 and L2, with frequencies of 1.5754 GHz and 1.2276 GHz, respectively. The wavelengths of these two frequencies are 0.1903 m and 0.2442 m, respectively. The pseudorange measurement (or code measurement) is a basic GPS observable that all types of GPS receivers can make. It utilizes the C/A or P pseudorandom codes modulated onto the carrier signals. The pseudorange measurement records the apparent time taken for the relevant code to travel from the satellite to the receiver, i.e., the time the signal arrives at the receiver according to the receiver clock minus the time the signal left the satellite according to the satellite clock. The carrier phase measurement is obtained by integrating a reconstructed carrier of the signal as it arrives at the receiver. Thus, the carrier phase measurement is also a measure of a transit time difference as determined by the time the signal left the satellite according to the satellite clock and the time it arrives at the receiver according to the receiver clock. However, because the initial number of whole cycles in transit between the satellite and the receiver when the receiver starts tracking the carrier phase of the signal is not known, the transit time difference obtained from the carrier phase will typically be in error by multiple carrier cycles, i.e., there is a whole-cycle ambiguity in the carrier phase measurement.

The range or distance between a GPS receiver and each of a multitude of satellites is calculated by multiplying each signal's travel time by the speed of light. These ranges are usually referred to as pseudoranges (false ranges) because the receiver clock generally has a significant time error which causes a common bias in the measured range. This common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. In standalone GPS navigation, where the receiver obtains code and/or carrier-phase ranges from multiple satellites without the benefit of corrections from any reference stations, the receiver is very limited in methods available to reduce the errors or noises in the ranges.

To eliminate or reduce systematic errors, differential operations are typically used in GPS applications. Differential GPS (DGPS) operations typically involve one or more reference receivers located at known sites (sometimes called base stations) together with a communication link between the user receiver and the reference receivers. The reference receivers are used to generate corrections associated with some or all of the above error types and these corrections are sent to the user receiver over the communication link. The user receiver then applies the corrections to its own measurements or position and thereby obtains a more accurate computed position. The corrections from a respective reference receiver can be in the form of corrections to the reference receiver position determined at the reference site or in the form of corrections to the specific GPS satellite clock and/or orbit. Differential operations using carrier-phase measurements are often referred to as real-time kinematic (RTK) positioning/navigation operations.

The fundamental concept of Differential GPS (DGPS) is to take advantage of the spatial and temporal correlations of the errors inherent in the GPS measurements. Thus, the corrections cancel or significantly mitigate most of the noise sources in the pseudorange and/or carrier phase measurements. The amount of mitigation depends upon the correlation between the error sources at the user and reference receiver. While the GPS satellite clock timing error, which appears as a bias on the pseudorange or carrier phase measurement, is perfectly correlated between the reference receiver and the user receiver, most of the other error factors are either not correlated or the correlation diminishes as a function of distance between them.

To overcome the error sources within the DGPS system in wide-area applications, various regional, wide-area, or global DGPS (sometimes referred to as WADGPS) techniques have been developed. The typical WADGPS includes a network of multiple reference stations in communication with a computational center or hub. Error corrections are computed at the hub based upon the known locations of the reference stations and the measurements taken by them. The computed error corrections are then transmitted to users via a communication link such as satellite, phone, or radio. By using multiple reference stations, WADGPS provides more accurate estimates of the error corrections.

A number of different techniques have been developed to obtain high-accuracy differential navigation using the GPS carrier-phase measurements. The technique with the highest accuracy is the RTK technique, which yields a typical accuracy of about one-centimeter. In order to obtain that accuracy, however, the whole-cycle ambiguity in the differential carrier-phase measurements must be determined. When the distance between the user receiver and the reference receiver (baseline distance) is short, the RTK technique is highly advantageous because in this case, the whole-cycle ambiguity can be resolved not only accurately but also quickly. On the other hand, when the baseline distance is more than a few tens of kilometers, it may become impossible to determine the whole-cycle ambiguity and the normal RTK accuracy cannot be achieved. Another limitation of the RTK technique is that it requires a local radio link to be maintained between the reference receiver and the navigation receiver to supply timely correction or measurement data.

The WADGPS techniques that employ a carrier-phase differential method can also achieve very high navigational accuracy. The WADGPS differential techniques are also typically characterized by reliable long distance low-frequency communication links or by reliable satellite communication links. Thus, corrections can generally be communicated to navigation receivers without significant interruption. However, the WADGPS techniques usually treat the whole-cycle ambiguities as a real-valued (non-integer) variable and solve for a "floating ambiguity," which is usually very poorly defined until measurement data covering a time interval of significant satellite geometry change have been obtained. Thus, in a WADGPS application, a time interval as long as one or two hours may be required to solve for the "floating ambiguity" with sufficient accuracy to yield a navigated position with an accuracy of less than (i.e., better than) 10 centimeters.

SUMMARY

Some embodiments include a method for combining the use of the standard RTK and the WADGPS navigation techniques so that the weaknesses of each technique can be complemented by the strengths of the other technique. The primary disadvantage of the WADGPS technique is that the navigation receiver takes a long elapsed time (sometimes more than an hour) to determine the floating ambiguity values with sufficient accuracy. These floating ambiguities are required to convert the carrier-phase measurements into accurate range measurements. The primary disadvantages of the RTK technique are that it requires a real-time (normally line of site) data link between a user GPS receiver and a reference GPS receiver and, further, that the whole-cycle ambiguity can only be determined when the separation distance between the reference GPS receiver and the user GPS receiver is relatively short.

These separate disadvantages can be removed by combining the use of the RTK and the WADGPS navigation techniques according to one embodiment of the present invention. The method includes using a known position of a user receiver to initialize the floating ambiguity values in a WADGPS system to avoid the long "pull-in" time. When the user receiver has been stationary, the known position of the user receiver may be a surveyed position or a position obtained from a prior operation. When the user receiver is moving, the known location may be obtained using an RTK system.

Thus, in a combined operation, when the communication link for the RTK navigation is available, the position, velocity and time (PVT) outputs of the user receiver can be obtained from both the RTK system and from the WADGPS code navigation solution running in the background and their outputs can be used to learn the offset between a WADGPS data value and a corresponding local RTK reference data value. After this offset has been determined, the RTK PVT outputs, adjusted by the offset, can be used subsequently to initialize the WADGPS system. Or, when the communication link for the RTK navigation is lost, or when the user receiver is too far from the reference station to initialize the RTK system, the offset, previously determined, can be applied to the PVT outputs from the WADGPS solution to obtain an accurate position relative to the RTK datum. The initialization of the WADGPS via the RTK system avoids the normal 15 minute to two hour "pull-in" time required to solve for the floating ambiguity values when the position of the user GPS receiver is not known. This combined system provides very accurate PVT solutions from the WADGPS system while the RTK system is unavailable or inaccurate, and makes the WADGPS technique more practical for real-time high-accuracy positioning and navigation purposes.

Some embodiments provide a method at a mobile satellite navigation receiver for calculating an offset between a local positioning system and a wide-area satellite positioning system. The mobile satellite navigation receiver determines a first solution of a position of the mobile satellite navigation receiver relative to a first local positioning system, wherein the first local positioning system includes one or more reference receivers at known locations. The mobile satellite navigation receiver determines a second solution of the position of the satellite navigation receiver relative to a wide-area differential satellite positioning system. The mobile satellite navigation receiver then calculates an offset between the first solution and the second solution.

Some embodiments provide a mobile satellite navigation receiver that includes a signal receiver for receiving navigation satellite signals, memory, one or more processors, and one or more programs stored in the memory. The one or more programs include instructions to: determine a first solution of a position of the mobile satellite navigation receiver relative to a first local positioning system, wherein the first local positioning system includes one or more reference receivers at known locations, determine a second solution of the position of the satellite navigation receiver relative to a wide-area differential satellite positioning system, and calculate an offset between the first solution and the second solution.

Some embodiments provide a computer readable storage medium storing one or more programs configured for execution by one or more processors in a mobile satellite navigation receiver. The one or more programs include instructions to: determine a first solution of a position of the mobile satellite navigation receiver relative to a first local positioning system, wherein the first local positioning system includes one or more reference receivers at known locations, determine a second solution of the position of the satellite navigation receiver relative to a wide-area differential satellite positioning system, and calculate an offset between the first solution and the second solution.

BRIEF DESCRIPTION OF THE DRAWINGS

Like reference numerals refer to corresponding parts throughout the drawings.

DESCRIPTION OF EMBODIMENTS

Figure 1:
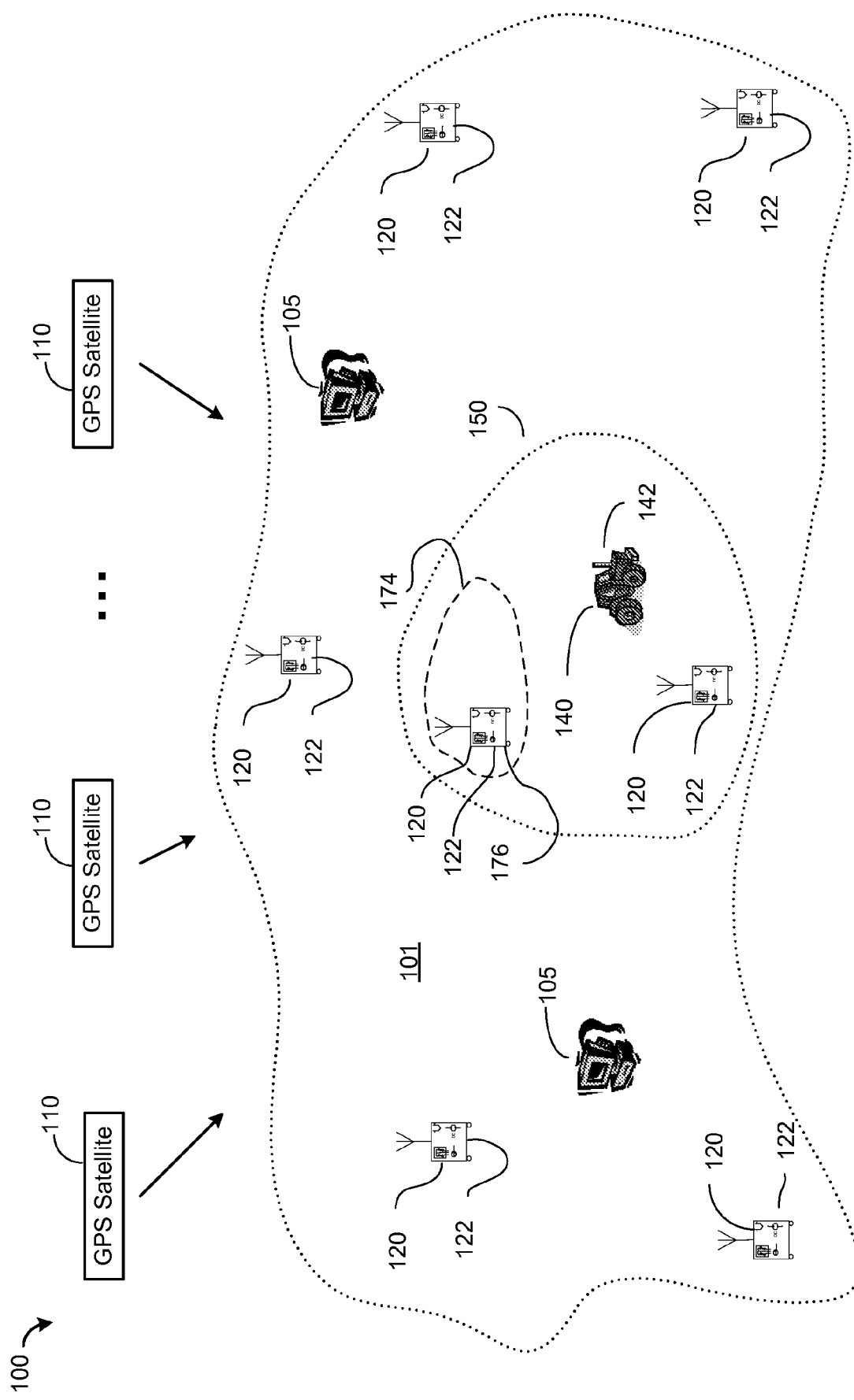
FIG. 1 is a block diagram of a combination of a WADGPS system, a local positioning system, and a local RTK system, according to some embodiments.

Combined Use of a Local Positioning System and a Wide-Area Differential Positioning System FIG. 1 illustrates a wide-area or global differential GPS (WADGPS) system 100 according to one embodiment of the present invention. As shown in FIG. 1, the WADGPS system 100 includes a network of reference stations 120 each having a GPS receiver 122, and one or more processing hubs 105. The reference stations 120 continuously provide raw GPS observables to the hub 105 for processing. These observables include GPS code and carrier phase measurements, ephemerides, and other information obtained according to signals received from a plurality of satellites 110 at the reference stations 120. The reference stations 120 are placed at known locations across a wide area 101, such as a continent, for a wide-area DGPS system, or across the globe for a global DGPS network. The hubs 105 are facilities at which the GPS observables are processed and DGPS corrections are computed. If multiple independent hubs are provided, it is preferred that they are geographically separated and operate in parallel.

The WADGPS system 100 may be utilized by one or more users (or user devices or objects) 140 each having a user GPS receiver 142 for positioning and/or navigation purposes. In some embodiments, the user 140 is associated with a nearby reference station 120 through a RTK radio link such that the user receiver 142 and the nearby reference station 120 forms a local RTK system 150. In some embodiments, the user 140 may also be associated with a local positioning system 174 having one or more landmarks 176. The one or more landmarks 176 may be active or passive. The one or more landmarks 176 may each have a GPS receiver 122.

System 100 further includes conventional data links (not shown) for providing reliable transport mechanisms for the GPS observables to be sent from the reference stations 120 to the hubs 105 and for the computed corrections to be broadcast from the hubs 105 to the reference stations 120 and the users 140. A continental WADGPS system usually has about 3 to 10 reference receivers and a global WADGPS system usually has about 20 to 100 reference receivers feeding data to the hubs 105. In some embodiments, the GPS observables are sent from the reference stations 120 to the hubs 105 via the Internet, and computed corrections are sent also via the Internet from the hubs to one or more land stations (not shown) to be uplinked to one more satellites (not shown), which then broadcast the computed corrections for receipt by the reference stations 120 and the user receiver 142.

Figure 2:
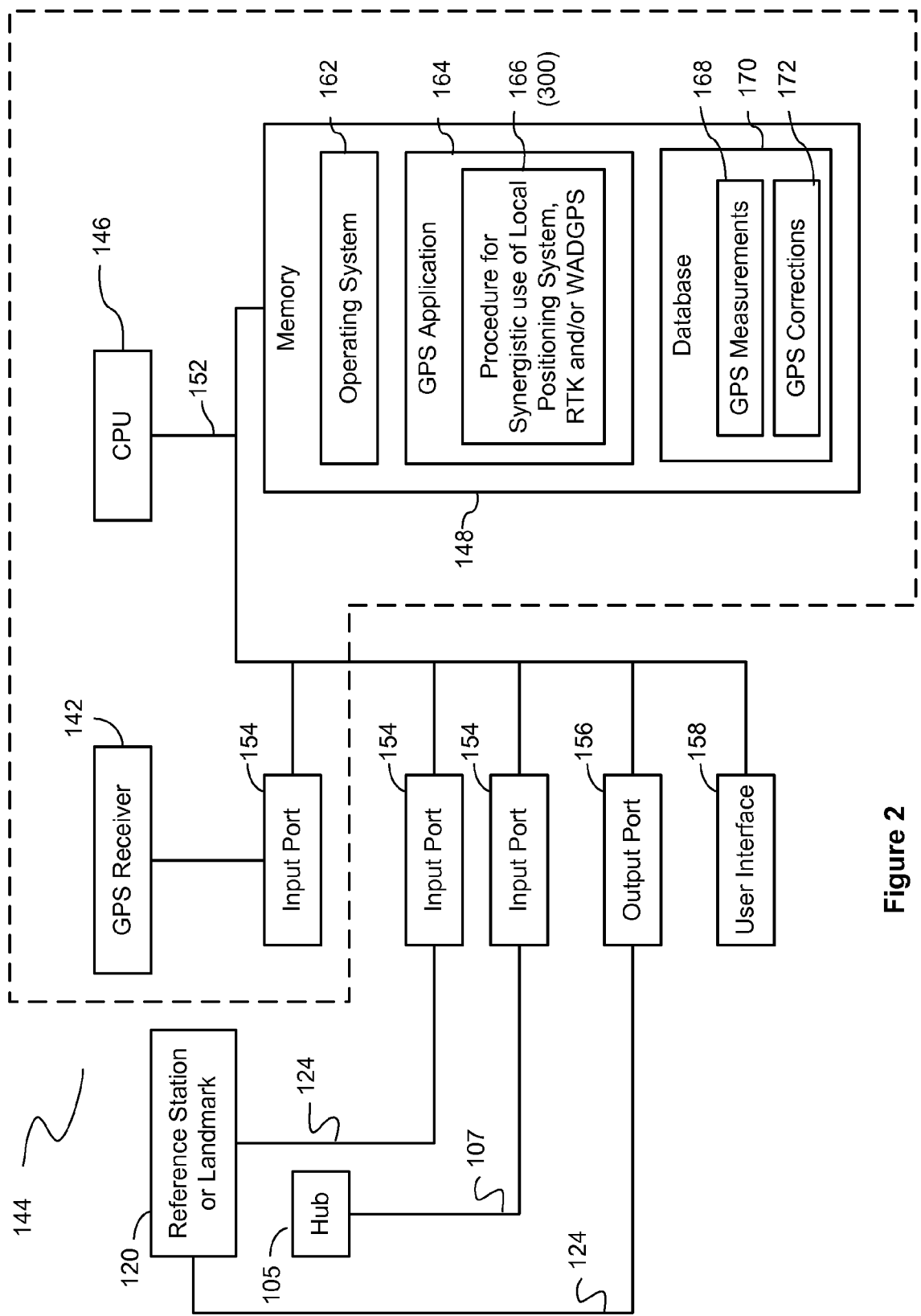
FIG. 2 is a block diagram of a computer system coupled to a user GPS receiver, according to some embodiments.

In some embodiments, the user or object 140 is also equipped with a computer system 144 coupled to the user GPS receiver 142. As shown in FIG. 2, computer system 144 includes a central processing unit (CPU) 146, memory 148, one or more input ports 154, one or more output ports 156, and (optionally) a user interface 158, coupled to each other by one or more communication buses 152. The memory 148 may include high-speed random access memory and may include nonvolatile mass storage, such as one or more magnetic disk storage devices or flash memory devices.

The memory 148 preferably stores an operating system 162, GPS application procedures 164, and a database 170. The GPS application procedures 164 may include procedures 166 for carrying out a method 300 for combining the use of the local positioning system 174, the local RTK system 150, and/or the WADGPS system 160, as described in more detail below. The operating system 162 and application programs and procedures 164 stored in memory 148 are for execution by the CPU 146 of the computer system 144. The memory 148 preferably also stores data structures used during execution of the GPS application procedures 164, including GPS pseudorange and carrier-phase measurements 168, GPS corrections 172 received from the hubs, as well as other data structures discussed in this document.

The input ports 154 are for receiving data from the GPS receiver 142, for receiving information from the reference station or landmark 120 in the local positioning system 174 or the local RTK system 150 via a radio link 124, and for receiving GPS corrections and other information from the hubs 105 via a satellite link 107. The output port 156 is used for outputting data to the reference station or landmark 120 via the radio link 124 or acoustic or laser devices (not shown). In some embodiments, the CPU 146 and the memory 148 of the computer system 144 are integrated with the GPS receiver 142 into a single device, within a single housing, as shown in FIG. 2. However, such integration is not required to carry out the methods of the present invention.

Therefore, the user or object 140 may engage in three different modes of operation either simultaneously or at different times. The user or object 140 may operate in a WADGPS mode in which the user or object 140 positions itself or navigates using the WADGPS system 100, in a RTK mode in which the user or object 140 positions itself or navigates using the local RTK system 150, and/or in a local positioning mode in which the user or object 140 positions itself or navigates using the local positioning system 174. When the user or object 140 is close to the one or more landmarks 176 with which it may be associated and a communication link between the user or object 140 and the one or more landmarks 176 can be maintained, the user can use the one or more landmarks 176 to position itself with respect to the one or more landmarks 176. When the user or object 140 is close to the reference station 120 with which it is associated and the radio link between the user or object 140 and the reference station 120 can be maintained, the user can use the local RTK system 150 to position itself with respect to the reference station 120. The local positioning system 174 and the local RTK system 150 are more advantageous than the WADGPS system 100 in that they are more accurate and that the whole-cycle integer ambiguity can be quickly resolved, as explained in the following.

Using the local RTK system 150, when measurements are taken with respect to n satellites 110 in view of the reference GPS receiver 122 and the associated user GPS receiver 142, the measurements can be used to solve for the position of the user or object 140 according to the following equation in array format:

$$(\nabla\Phi+N)\lambda = Hx + n_\phi \qquad (1)$$

where $\nabla\Phi = [\nabla\phi_1\ \nabla\phi_2\ \ldots\ \nabla\phi_n]^T$ is a carrier phase measurement vector formed by the differential carrier phase measurement with respect to each of the n satellites 110, $N = [N_1\ N_2\ \ldots\ N_n]^T$ is an integer ambiguity vector formed by the differential integer ambiguity associated with each of the differential carrier phase measurements in the carrier phase measurement vector, $H = [h_1\ h_2\ \ldots\ h_n]^T$ is a measurement sensitivity matrix formed by the unit vectors from the user or object 140 to the n satellites 110, x is a real unknown state vector (or real vector) including a position vector from the reference station 120 to the user or object 140 in the local RTK system 150, and $n_\phi = [n_{\phi_1}, n_{\phi_2} \ldots n_{\phi_n}]^T$ is a measurement noise vector (or phase range residual vector) formed by the differential carrier phase noise with respect to each of the n satellites 110.

To solve for the real vector x using Equation (1), the integer ambiguity vector N needs to be resolved. Many different methods have been developed to resolve the integer ambiguity values included in the integer ambiguity vector N and these methods typically use a search process to find a combination of integer ambiguity values that satisfy certain criteria, such as a minimum norm of a measurement residual vector $\Delta_\Phi$, $$\Delta_\Phi = (\nabla\Phi + \tilde{N})\lambda - H\hat{x} \quad (2)$$

where $\Delta_\Phi$ is a phase range residual vector corresponding to a candidate integer ambiguity vector $\tilde{N}$ including the combination of integer ambiguity values, and $\hat{x}$ is a least squares solution of Equation (1), $$\hat{x} = [H^T H]^{-1} H^T (\nabla \Phi + N)\lambda \text{ or,} \quad (3)$$

$$\hat{x} = [H^T R H]^{-1} H^T R^1 (\nabla \Phi + N)\lambda \text{ where} \quad (4)$$

$$R = \begin{bmatrix} \sigma_1^2 & \cdots & 0 \\ \vdots & \ddots & \vdots \\ 0 & & \sigma_n^2 \end{bmatrix} \quad (5)$$

is a measurement covariance matrix formed by $\sigma_i$, which is a standard deviation of the differential carrier phase noise $n_{\phi_i}$, calculated using conventional methods. An example of the methods for calculating $\sigma_i$ can be found in *"Precision, Cross Correlation, and Time Correlation of GPS Phase and Code Observations,"* by Peter Bona, GPS Solutions, Vol. 4, No. 2, Fall 2000, p. 3-13, or in *"Tightly Integrated Attitude Determination Methods for Low-Cost Inertial Navigation: Two-Antenna GPS and GPS/Magnetometer,"* by Yang, Y., Ph.D. Dissertation, Dept. of Electrical Engineering, University of California, Riverside, Calif. June 2001, both hereby incorporated by reference.

Other examples of the search methods can be found in "Instantaneous Ambiguity Resolution," by Hatch, R., in the Proceedings of the KIS Symposium 1990, Banff, Canada, which is incorporated herein by reference, and in commonly owned patent application for "Fast Ambiguity Resolution for Real Time Kinematic Survey and Navigation," patent application Ser. No. 10/338,264, which is also incorporated herein by reference.

With the integer ambiguity resolved, the position, velocity and time (PVT) of the user receiver 142 can be accurately computed as solutions of the local RTK system 150.

Using the local positioning system 174, the position, velocity and time (PVT) of the user receiver 142 can be accurately computed as solutions of the local positioning system 174. For example, range and angular information relative to the one or more landmarks may be determined using a time of flight of signals and/or Doppler frequency shifts. Additional discussion of determining range and angular information in a local positioning system is provided in U.S. patent application Ser. No. 11/103,964, entitled "Improved Radar System for Local Positioning", filed on Apr. 11, 2005, the contents of which are herewith incorporated by reference. In addition, measurements taken with respect to n satellites 110 in view of the GPS receiver 122 in one or more of the one or more landmarks 176 and the associated user GPS receiver 142, the measurements can be used to solve for the position of the user or object 140 according to the preceding equations.

In spite of their many advantages, the local positioning system 174 and/or the local RTK system 150 may not be available to the user or object 140 at all times because the user may move to a location that is too far from the one or more landmarks 176 and/or the reference station 120, or is out of site of the one or more landmarks 176 and/or the reference station 120 so that the communication link and/or the radio link 124 between the user or object 140 and the landmark and/or reference station cannot be maintained. In these situations, ionospheric induced error cannot be satisfactorily removed by taking into account the difference between measurements at the user or object 140 and at the landmark 176 and/or reference station 120. This error affects the above search process for the integer ambiguity vector because it causes measurement residuals included in the measurement residual vector $\Delta_\Phi$ to increase.

Therefore, in situations where the local positioning system 174 and the local RTK system 150 is not available or has lost its accuracy due to a large separation between the user GPS receiver and the landmark and reference station, the user may need to operate in the WADGPS mode in which a different approach to resolving integer ambiguity is used. Using the WADGPS system 100, each whole-cycle ambiguity is estimated as a real-valued (non-integer) variable. This practice is often referred to as determining a "floating ambiguity" value. One method for determining the "floating ambiguity" value involves the formation of refraction corrected code and carrier-phase measurements based on raw GPS measurements taken at the user or object 140, the scaling of the carrier-phase measurements to the same units as the code measurements, and the subtraction of each scaled carrier-phase measurement from the corresponding code measurement to obtain an offset value. In some embodiments, the refraction-corrected code measurement, designated as $P_{RC}$, is formed as follows:

$$P_{RC} = \frac{f_1^2}{(f_1^2 - f_2^2)} P_1 - \frac{f_2^2}{(f_1^2 - f_2^2)} P_2 \cong P_1 - 1.5457(P_1 - P_2), \quad (6)$$

where $P_1$ and $P_2$ are the raw pseudorange code measurements on the L1 and L2 frequencies $f_1$ and $f_2$, respectively, at a particular measurement epoch. The refraction-corrected carrier-phase measurement, designated as $L_{RC}$, is formed similarly as follows:

$$L_{RC} = \frac{f_1^2}{(f_1^2 - f_2^2)} L_1 - \frac{f_2^2}{(f_1^2 - f_2^2)} L_2 \cong L_1 - 1.5457(L_1 - L_2), \quad (7)$$

where $L_1$ and $L_2$ are the carrier-phase measurements scaled by the wavelengths of the L1 and L2 signals, respectively, and each includes an approximate whole-cycle ambiguity value that has been added to cause the scaled carrier-phase measurement to be close to the same value as the corresponding code measurement. Thus, $$L_1 = (\phi_1 + N_1)\lambda_1, \quad (8)$$

$$L_2 = (\phi_2 + N_2)\lambda_2, \quad (9)$$

where $\phi_1$ and $\phi_2$ are the raw carrier phase measurement on the L1 and L2 frequencies, respectively, at the same measurement epoch, and the whole-cycle values of $N_1$ and $N_2$ have been initialized at the start of carrier-phase tracking by the user or object 140 to give values that are within one carrier wavelength of the corresponding code measurements so as to keep the differences between the scaled carrier-phase measurements and the corresponding code measurements small. From the form of Equation (7), it is noted that the refraction corrected carrier-phase measurement includes a whole-cycle ambiguity with a wavelength $\lambda$ determined by the sum of $f_1$ and $f_2$ (which is about 2.803 GHz), so that $\lambda$ is approximately 0.1070 meters (i.e., $c/(f_1+f_2)$).

Because the ionospheric effects have been removed from both the code and carrier-phase measurements according to Equations (6)-(9) and the effects of satellite clock and orbit errors on the pseudorange and carrier-phase measurements are the same, the values of $P_{RC}$ and $L_{RC}$ obtained in step 310 should be almost identical except for the possible whole-cycle ambiguity associated with the carrier-phase measurement $L_{RC}$ and the higher multipath noise in the code measurement $P_{RC}$. This allows the resolution of the whole-cycle ambiguity in $L_{RC}$ by smoothing an offset ($O=P_{RC}-L_{RC}$) between the refraction corrected code measurement and the refraction corrected carrier-phase measurement across a series of measurement epochs so that the offset becomes an increasingly accurate estimate of the "floating ambiguity." The smoothed offset value can be further adjusted by using post-fix measurement residuals to provide an additional carrier-phase measurement adjustment such that the adjusted measurement residuals are near zero.

In some embodiments, the offset is smoothed by taking an expanding average of the offset as follows:

$$O_i = O_{i-1} + (P_{RC}^i - L_{RC}^i - O_{i-1})/\eta, \quad (10)$$

where $i=1, 2, 3, \ldots$, is used to designate a measurement epoch, and the value of $\eta$ is a confidence value that increases as $O_i$ becomes a more accurate estimate of the floating ambiguity value. In some embodiments, $\eta$ is equal to $i$ until a maximum value of averaging is attained. For example, if the carrier-phase measurement is assumed to have only $1/100^{th}$ of the noise of the code measurement, the value of "$\eta$" would be limited to be less than 100 squared or 10,000. Equation (10) can thus be recursively computed until a predetermined accuracy of the floating ambiguity value is reached.

With the smoothed offset $O_i$, a smoothed refraction-corrected code measurement, S, can be obtained by adding the refraction corrected carrier-phase measurement for the current measurement epoch to the smoothed offset, so that $$S_i = O_i + L_i, \quad (11)$$

which has the accuracy of the carrier-phase measurement but without the associated ambiguities.

The above process as described in association with Equations (6)-(11) is performed for each of a plurality of satellites in view of the user GPS receiver 142. With the smoothed refraction-corrected code measurement available for each of the plurality of satellites in view of the user GPS receiver 142, the pseudoranges to these satellites can be obtained. These peudoranges are adjusted with the WADGPS corrections received from the hubs 105 and are used in a weighted least squares solution to calculate the state vector x. This way, the position, velocity and time (PVT) of the user GPS receiver 142 can be computed as WADGPS solutions for the PVT of the user GPS receiver 142.

Other examples of the methods to obtained the smoothed, refraction corrected offsets can be found in "The Synergism of Code and Carrier Measurements," by Hatch, R. in the Proceedings of the Third International Geodetic Symposium on Satellite Doppler Positioning, DMA, NOS, Las Cruces, N.M., New Mexico State University, Vol. II, pp. 1213-1232, which is incorporated herein by reference, and in commonly owned patent application for a "Method for Generating Clock Corrections for a Wide-Area or Global Differential GPS System," which is also incorporated herein by reference.

It is also possible to solve for the "floating ambiguity" values as separate states in a least-squares or Kalman filter solution. When the ambiguities are included as states, an estimate value for each floating ambiguity value is adjusted according to a variance so that it becomes increasingly accurate as the geometry of the system changes due to satellite motion. Thus, this technique also yields an increasingly accurate estimate over time. See Patrick H. C. Hwang's paper in *Navigation* Vol. 38, No. 1, Spring 1991, titled "Kinematic GPS for Differential Positioning: Resolving Integer Ambiguities on the Fly," which is incorporated herein by reference.

There are many combinations and variations of the above techniques which can be used to estimate the "floating ambiguity" values. However, all of them involve processing data over a significant time interval. The time interval can often be as long as one or two hours before one can be confident that the "floating ambiguity" is accurate enough to yield an accuracy of less than 10 centimeters in the navigated position of the user 140. To shorten the time interval for obtaining the "floating ambiguity" values, the WADGPS system can be initialized as described below using a know location of the user GPS receiver 142.

Figure 3A:
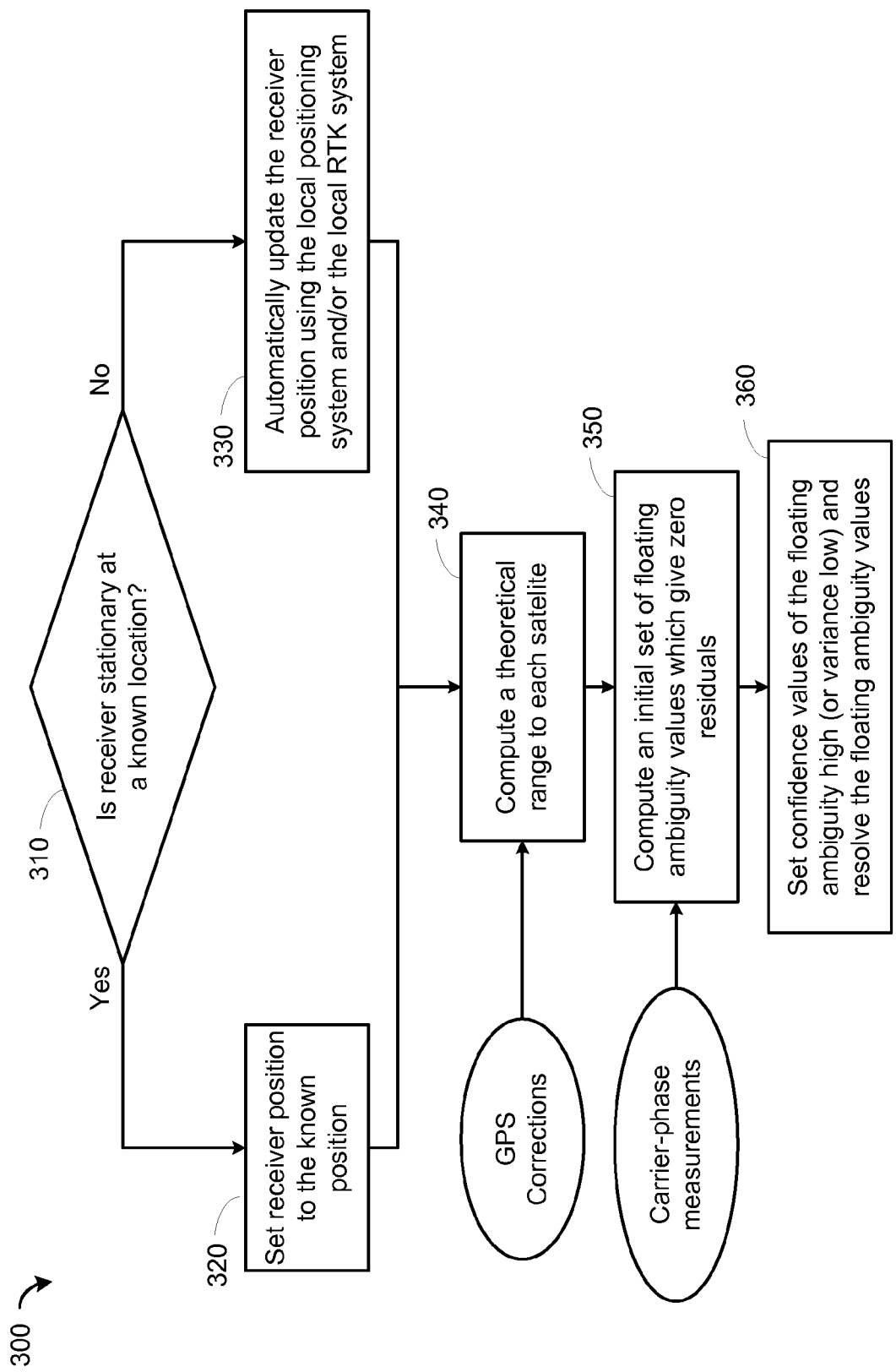
FIG. 3A is a flowchart illustrating a method for combining the use of the WADGPS system, the local RTK system, and/or the local positioning system, according to some embodiments.

FIG. 3A illustrates a method 300 for initializing the WADGPS system 100. As shown in FIG. 3, method 300 includes a step 310 in which it is determined whether the user is stationary at a known location. This can be done according to user input or via some conventional mechanism that allows the computer 144 to determine whether the user receiver 142 has been stationary. If the position of the user receiver 142 is accurately known, that position can be used to compute the floating ambiguity values without the assistance of the local positioning system 174 and/or the local RTK system 150, as explained in more detail below. A surveyed position of the user GPS receiver 142 could be used as the known position, or in some environments, the position may be known simply because the user or object 140 has been stationary and the user position has already been determined during a prior operation.

In response to the determination that the user is stationary at a known location, method 300 proceeds to a step 320 in which the user receiver position is set to the known location. Otherwise, method 300 proceeds to a step 330 in which the local positioning system 174 and/or the local RTK system 150 are enabled to automatically update the user location using the method discussed above.

Method 300 further includes a step 340 in which the user receiver location, whether it is determined in step 320 or step 330, is used to compute a set of theoretical ranges to the satellites 110. This may involve computing the positions of the satellites 110 based on the broadcast ephemeredes from the WADGPS system 100 and adjusting those positions by the orbital corrections broadcast by the WADGPS system 100. Given both the user receiver position and the satellite positions in Cartesian coordinates, the theoretical range from the user 140 to each satellite 110 can be computed as follows:

$$r = \sqrt{(x_s - x_u)^2 + (y_s - y_u)^2 + (z_s - z_u)^2} \quad (12)$$

where subscript s designates the satellite coordinate and subscript u designates the user or object receiver coordinate.

Method 300 further includes a step 350 in which the initial floating ambiguity value, a, corresponding to each satellite is calculated by subtracting from the computed theoretical range the range obtained from the refraction-corrected carrier-phase measurement with respect to the same satellite so that, $$a = r - L_{RC}^0 \quad (13)$$

where $L_{RC}^0$ represents the refraction-corrected carrier-phase measurement computed according to Equation (7) at a beginning measurement epoch.

Method 300 further includes a step 360 in which the floating ambiguity values are resolved by adding the initial floating ambiguity values to the corresponding refraction-corrected carrier-phase measurements in subsequent measurement epochs, i.e., $$L_{RC}^i = L_{RC}^i + a,$$

by treating the floating ambiguity values as well known so that the confidence is set to high (or the variance is set to low). In practice, step 360 is accomplished by using a small value of gain to adjust the floating ambiguity values in a process for determining the floating ambiguity values. For example, if the floating ambiguity values are determined by smoothing the offset between the refraction-corrected code measurement and the refraction-corrected carrier-phase measurement according to Equation (10), a small gain means treating the floating ambiguity value as if a large number of offset values have been used in computing it, so that $\eta = i + $(a large number). If the ambiguity value is determined in a Kalman filter process, a small gain is achieved by setting the variance of the ambiguity state to a small value.

Thus, by using the known location of a stationary user receiver 142, by using the local positioning system 174 and/or by using the local RTK system 150 to initialize the floating ambiguity values, a normal fifteen minute to two hours of "pull-in" time required to solve for the floating ambiguity values when the user receiver position is not known is avoided. This can greatly speed up the process for resolving carrier-phase ambiguities in the WADGPS system 100, making the WADGPS system 100 more suitable for real-time positioning and/or navigation purposes.

In order to use the local positioning system 174 and/or the local RTK system 150 to update the user receiver position in the method 300, the position of the one or more landmarks 176 in the local positioning system 174 and/or the position of the reference station 120 in the local RTK system 150 may be determined accurately in the WADGPS system 100. A conventional local positioning system or local RTK system can be used in a relative sense, meaning that the position of the user receiver 142 can be determined relative to the one or more landmarks and/or the reference receiver. This way, accurate relative positions of the user GPS receiver 142 can be obtained even though the absolute coordinates of the one or more landmarks and/or reference station may or may not be particularly accurate and coordinate data other than the normal GPS data are used to position the landmark and/or the reference station. For the combined use of the local position system 174, the RTK system 150, and/or the WADGPS system 100, however, an absolute position of the one or more landmarks 176 in the local positioning system 174 and the reference station 120 in the RTK system 150 need to be determined. If an incorrect position is used for the one or more landmarks 176 in the local positioning system 174 or the reference station 120 in the local RTK system 150, it will cause the floating ambiguity values computed as described above to be incorrect. This will lead to a slow drift of the computed position of the user receiver 142 as the floating ambiguity values are slowly adjusted to the correct value during subsequent WADGPS processing.

In some embodiments, a mean position of the one or more landmarks 176 in the local positioning system 174 and/or a mean position of the reference station 120 in the RTK system 150 may be determined based on hours of positioning data from the WADGPS system 100 for increased reliability. In some embodiments, a computer system in the one or more landmarks 176 and/or at the reference station 120 accepts an operator input value for its position and provides the position to the user 140. This allows the relative local positioning and/or RTK positioning to commence immediately using that reference position. At the same time, a more accurate position of the one or more landmarks 176 and/or the reference station 120 may be determined by the WADGPS system 100 and is transmitted to the one or more landmarks 176 and/or the reference station 120. This more accurate position or an offset between the operator input position and the more accurate position of the one or more landmarks 176 and/or the reference station 120 determined by the WADGPS system 100 may then be transmitted at a relatively low rate to the user 140.

Figure 3B:
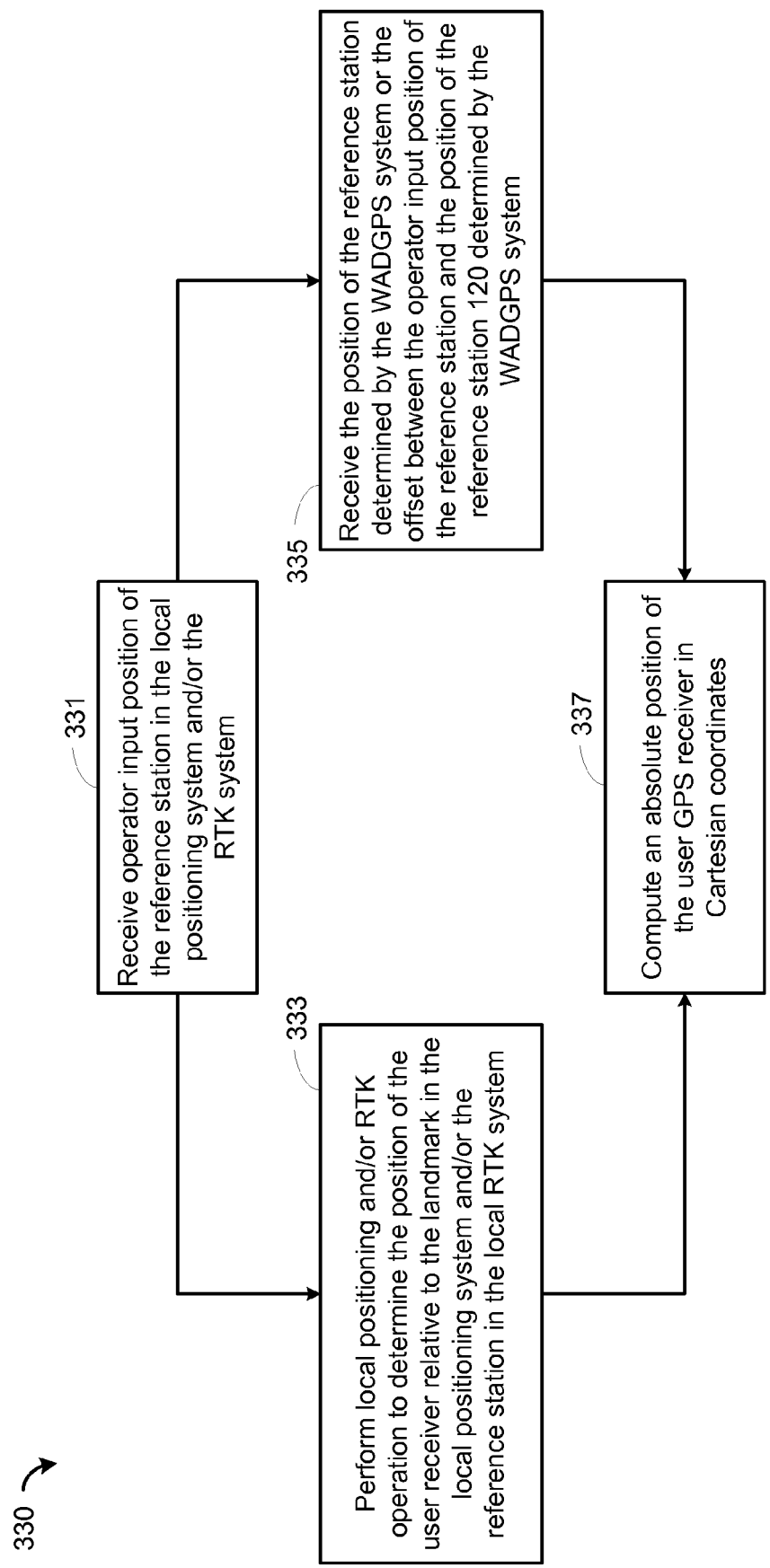
FIG. 3B is a flowchart illustrating a method for updating a receiver position using a local RTK system, according to some embodiments.

FIG. 3B illustrates in more detail step 330 in the method 300 in which the user position is updated using the local positioning system 174 and/or the local RTK system 150. As shown in FIG. 3B, step 330 includes a substep 331 in which the user or object 140 receives the operator input position of the reference station 120 in the local positioning system 174 and/or the RTK system 150, and a substep 333 in which the user or object 140 performs local positioning and/or local RTK operation to determine its own position relative to that of the one or more landmarks 176 and/or the reference station 120. Step 330 further includes a substep 335 in which the user or object 140 receives the more accurate position of the reference station 120 determined by the WADGPS system 100 or the offset between the operator input position of the reference station 120 and the more accurate position of the reference station 120 determined by the WADGPS system 100. Step 330 further includes a substep 337 in which the user or object 140 computes an absolute position of the user GPS receiver 142 in Cartesian coordinates using either the user input position of the landmark and/or reference station or the position of the one or more landmarks 176 and/or the reference station 120 determined by the WADGPS system 100 (if available).

An example where benefits could be obtained by using the method 300 is in positioning a train. When a train passes through a tunnel, the local positioning system link, the RTK link and the global WADGPS link would be lost. In this situation the local positioning system data link and/or the RTK data link can be set up to initialize the WADGPS floating ambiguity values as the train comes out of the tunnel. This would avoid the long data interval otherwise required to determine the correct floating ambiguity values.

Another example where benefits could be obtained by using the method 300 is in positioning an airplane right after take-off. In this case, a local positioning system and/or a local RTK system at an airport where a plane is preparing to take off can be used to initialize the WADGPS ambiguities either before or during the take-off.

Thus, the user or object 140, which includes the user GPS receiver 142 and the computer system 144 coupled to the user GPS receiver 142, can operate in both the local positioning mode, the RTK mode and/or the WADGPS mode. The local positioning system 174 and the local RTK system 150 are more favorable than the WADGPS system because the search process for local positioning system 174 and the local RTK system 150 as discussed above take much less time than the smoothing method in the WADGPS system 100 for resolving the integer ambiguity values. In the search process, the smoothing of the code measurements is either not required or a smoothing of the code measurements of much shorter duration is performed, not to determine the whole-cycle ambiguity directly, but to provide a decreased uncertainty in an initial set of integer ambiguity values so that the subsequent search process can be more tightly constrained. For that reason, only a few seconds of data is sufficient for obtaining the initial set of ambiguity values.

The local positioning system 174 and/or the local RTK system 150, however, are only available in situations where the communication link between the user GPS receiver 142 and the one or more landmarks 176 in the local positioning system 174 and/or the reference station 120 in the local RTK system 150 can be maintained and the user or object 140 does not wander too far from the one or more landmarks 176 in the local positioning system 174 and/or the reference station 120 in the local RTK system 150. When these conditions are not satisfied, that is, when the local positioning system 174 and/or the local RTK system 150 are either not available or inaccurate, the user can resort to the WADGPS system 100 for navigation by using the user receiver position last determined by the local positioning system 174 and/or the RTK system 150 to initialize the WADGPS system so that the long "pull-in" time to obtain the "floating ambiguity" values is avoided.

Figure 4A:
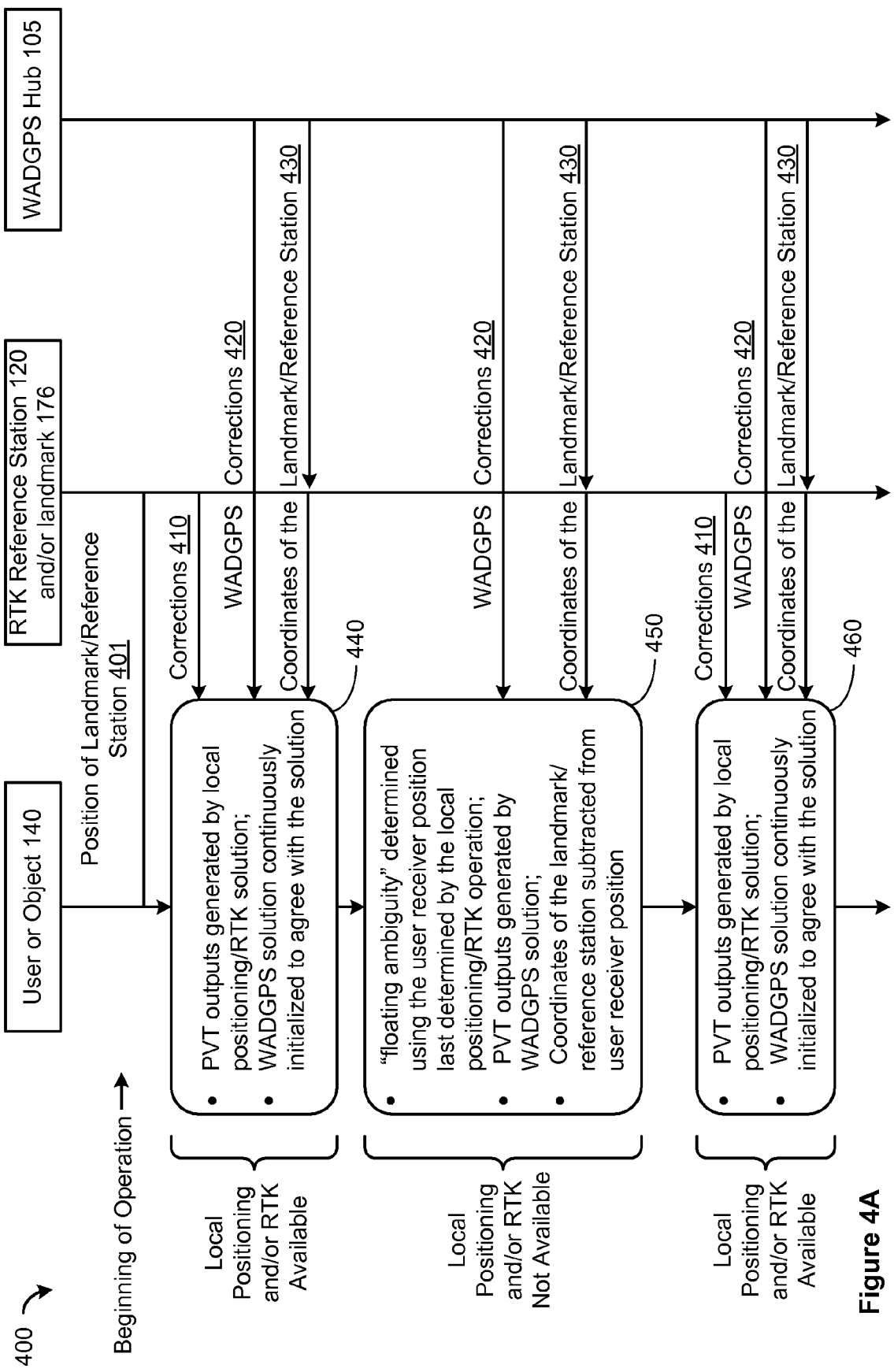
FIG. 4A is a flowchart illustrating a process flow for combined operation using both the WADGPS system and the local RTK system, according to some embodiments.

FIG. 4 illustrates a process flow 400 for a combined local positioning, RTK and WADGPS operation performed by the user computer system 144. The process flow includes steps 440, 450 and 460. As shown in FIG. 4, while the local positioning corrections are available, the user 140 operates in the local positioning mode and while the RTK corrections are available, the user 140 operates in the RTK mode. The user 140 receives the position 401 of the landmark/reference station 120 in the local positioning system 174 and/or the local RTK system 150 and performs step 440 in which the user receiver's PVT are determined using the local positioning/RTK corrections 410 received from the landmark 176 in the local positioning system 174 and/or the reference station 120 in the local RTK system 150. During the performance of step 440, the user 140 may continue to receive the WADGPS corrections 420 from the hubs 105 so that WADGPS solutions can be generated in the background. The user 140 may also receive updated position 430 of the landmark 176 in the local positioning system 176 and/or the reference station 120 in the local RTK system 150 from the hub 105 at a relatively low rate. Using the updated position of the landmark 176 and/or the reference station 120 and the local positioning/RTK solutions of the user receiver position, the WADGPS solutions can be continuously initialized in the background to agree with the local positioning/RTK solutions, according to the method 300 discussed above.

When the local positioning and the RTK corrections are lost, the user 140 switches to the WADGPS mode of operation and performs step 450, in which the user 140 uses the user receiver position determined in the local positioning and/or the RTK mode of operation immediately before the local positioning/RTK corrections became unavailable to initialize the floating ambiguity values for the WADGPS mode of operation according to the method 300 discussed above. This way, the "floating ambiguity" values can be determined without the long "pull-in" time. During the performance of step 450, the user 140 continues to receive the WADGPS corrections 420 from the hubs 105. The user 140 may also receive the updated position 430 of the one or more landmarks 176 in the local positioning system 174 and/or the reference station 120 in the local RTK system 150 from the hub 105 at a relatively low rate. The reference station coordinates are used to transform the user receiver position generated in the WADGPS mode into position relative to the one or more landmarks 176 and/or the local reference station 120. This way the PVT results generated by the user computer system 144 will seamlessly transition between the different modes of operation.

When the local positioning and/or the RTK corrections are available again, the user resumes local positioning and/or RTK operation in step 460, which is similar to the local positioning and/or the RTK operation in step 440.

Figure 4B:
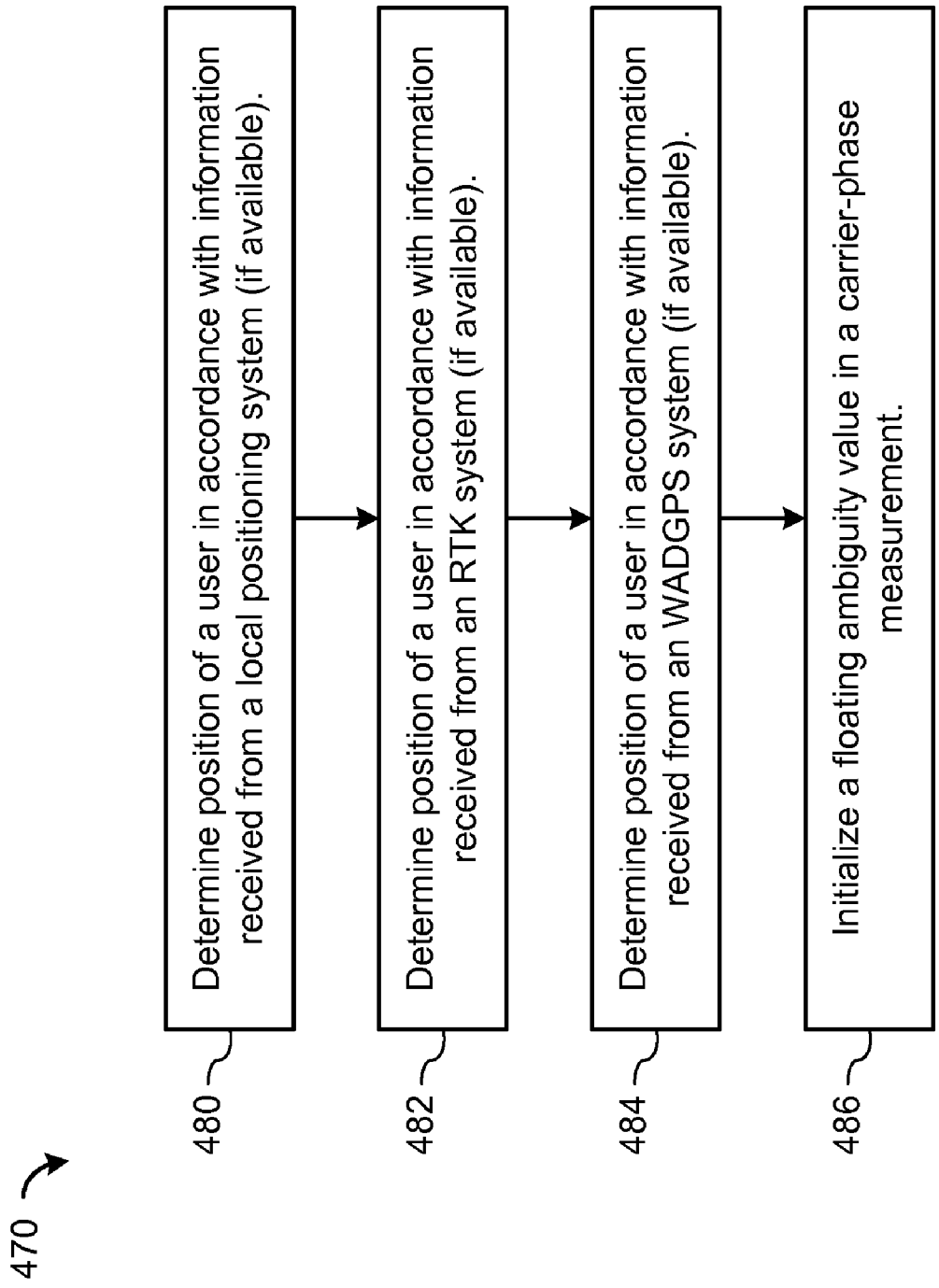
FIG. 4B is a flow chart illustrating a process flow for use of a local positioning system, a local RTK system, and/or a WADGPS system, according to some embodiments.

FIG. 4B is a flow chart illustrating a process flow 470 for use of a local positioning system, a local RTK system, and/or a WADGPS system. If available, a position of a user may be determined in accordance with information received from a local positioning system (480). If available, a position of a user may be determined in accordance with information received from an RTK system (482). If available, a position of a user may be determined in accordance with information received from a WADGPS system (484). A floating ambiguity value in a carrier-phase measurement may be initialized (486). The process 470 may include fewer or additional operations. Two or more operations may be combined and a position of at least one operation may be changed.

In an exemplary embodiment, the user GPS receiver 142 may operate in a first mode of operation that uses the local positioning system 176 to determine a first position of the user 140 when communication with the local positioning system 176 is available. A second position of the user 140 may be determined in accordance with carrier-phase measurements performed using the WADGPS system 100 in a second mode of operation. A known position of the user 140, such as the first position, may be use to initialize a floating ambiguity value in the carrier-phase measurements. In some embodiments, the known position of the user 140 may be provided and/or input by the user.

In some embodiments, the first mode of operation is used to determine the user 140 position if it is available. If communication with the local positioning system 174 is lost, however, the second mode of operation may be used. Communication with the local positioning system 174 may be lost if a distance to the local position system 174 exceeds a value, such as 100 m, 500 m, 1000 m, 10,000 m or more.

In some embodiments, the first mode of operation and the second mode of operation may be performed substantially simultaneously and a difference between the first position and the second position is used to initialize the floating ambiguity value in the carrier-phase measurements. In some embodiments, the first mode of operation and the second mode of operation may be performed substantially simultaneously and a difference between the first position and the second position is used to determine a third position of the user 140. The third position of the user may be in accordance with information received from the local reference receiver 122 in the RTK system 150 in a third mode of operation.

In some embodiments, the third mode of operation may be used when communication with the local positioning system 174 is lost and the first mode of operation may be used when the communication with the local position system 174 is available again.

In some embodiments, the second mode of operation is used when communication with the local reference receiver 122 and the local positioning system 174 is lost, the first mode of operation is used when communication with the local positioning system 174 is available, and wherein the third mode of operation is used when the communication with the local reference receiver 122 is available and the communication with the local positioning system 174 is lost.

In some embodiments, the second mode of operation is used if a distance from the local positioning system 174 to the user 140 is greater than a first value (such as 10,000 m), the first mode of operation is used if the distance from the local positioning system 174 to the user 140 is less than a second value (such as 1000 m), and the third mode of operation is used if the distance from the local positioning system 174 to the user 140 is between the first pre-determined value and the second pre-determined value.

Figure 5:
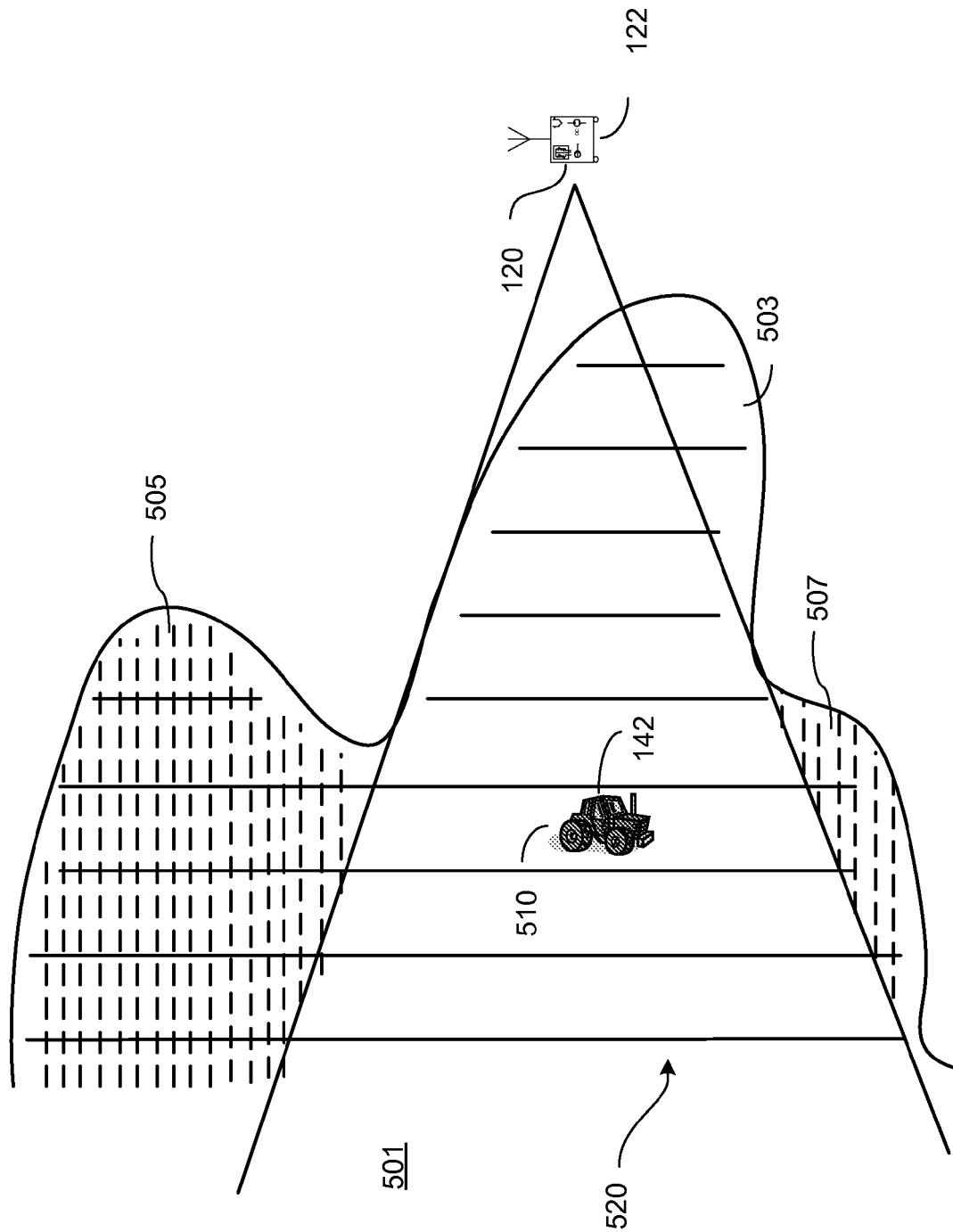
FIG. 5 is a diagram illustrating a situation in which the combined operation can be used, according to some embodiments.

The process 400 can be used in many applications. One application involves an extension of a local positioning system and/or an RTK operation into areas where a communication link with the local positioning system and/or the RTK radio link cannot be maintained, but where the WADGPS communication link is at least generally available. For example, as shown in FIG. 5, the user or object 140 may be a farming vehicle 510 moving in rows 520 in an area 501 of rolling hills, with the user receiver 142 attached to the farming vehicle or to farming equipment that is connected to the farming vehicle. The area 501 includes area 503 that is visible from the reference station 120 in the local RTK system 150 and areas (shaded) 505 and 507 that are not visible from the reference station 120. Because the RTK communication link is usually line of site, the RTK data would be lost whenever the user GPS receiver 142 is moved from area 503 to area 505 or 507. But the data link between the user receiver 142 and the WADGPS system 100 is generally available because it is often facilitated by satellites. By initializing the floating ambiguities in the WADGPS system 100 whenever the RTK radio link is available and the RTK system 150 is operational, the accuracy of the RTK operation can be practically preserved during those intervals when the RTK link is lost.

While the WADGPS system 100 in FIG. 1 has been used in the above description, it will be appreciated that any regional, wide area, or global system which makes use of carrier-phase measurements from satellites for positioning and/or navigation purposes and thus requires determining ambiguity values associated with the phase measurements can also benefit by the method 300 described above. Examples of these systems include the Starfire™ System developed by John Deere Company, and the regional High Accuracy-National Differential (HA-ND) GPS system being developed by several U.S. government agencies.

Determining an Offset Vector at a Mobile Satellite Navigation Receiver

As described above, the combined use of a local positioning system (e.g., an RTK positioning system) and a regional, wide-area, or global carrier-phase positioning and/or navigation system (e.g., a WADGPS positioning system) avoids the disadvantages associated with both a local positioning system and a wide-area positioning system when they are used separately. In order to use the above-described techniques, an offset vector between a reference datum of the local positioning system and a reference datum of the wide-area differential positioning system must be determined to within a specified accuracy. However, the techniques described above are directed to proprietary local positioning systems in which the position of a mobile satellite navigation receiver (e.g., the GPS receiver 142 in FIG. 1) is determined relative to base stations of the proprietary local positioning systems. As a result, the position of the mobile satellite navigation receiver cannot be determined relative to base stations of other local positioning systems (e.g., RTK) using standard protocols such as the Radio Technical Commission for Maritime Services (RTCM) recommended standards RTCM 2.3/3.0 and Compact Measurement Record MR/CMR+ formats. Furthermore, the techniques described above require that the proprietary base stations of the local positioning system receive data (e.g., satellite positioning signals, etc.) from a wide-area differential positioning system.

Thus, to overcome these drawbacks, some embodiments provide a technique to determine an offset vector between a reference datum of a local positioning system and a reference datum of a wide-area differential positioning system in real-time at a mobile satellite navigation receiver. In these embodiments, the offset vector is determined based on the information available at the mobile satellite navigation receiver. Thus, a base receiver of the local positioning system (e.g., an RTK base receiver) does not need to receive regional, wide-area, or global carrier-phase positioning signals (e.g., WADGPS signals) and is not required to transmit the offset vector between a reference datum of a local positioning system and a reference datum of a wide-area differential positioning system using a proprietary protocol.

Note that for the sake of clarity the embodiments described herein refer to RTK positioning systems and WADGPS positioning systems. However, it should be noted that a "RTK positioning system" generally refers to a local positioning system. Similarly, a "WADGPS positioning system" generally refers to a regional, wide-area differential or global carrier-phase positioning system. Furthermore, the term "GPS" or "global positioning system" is used herein to generally refer to a satellite positioning system. For example, the satellite positioning system can include a satellite positioning system that determines positions of mobile satellite navigation receivers that receive signals from GPS satellites, GLONASS satellites, and/or Galelio satellites. Moreover, the positioning system can also include navigation capabilities (e.g., routing, etc.).

In some embodiments, the mobile satellite navigation receiver may engage in three different modes of operation either simultaneously or at different times. First, the mobile satellite navigation receiver may operate in a WADGPS mode in which the mobile satellite navigation receiver positions itself or navigates using a WADGPS system. Second, the mobile satellite navigation receiver may operate in the RTK mode in which the mobile satellite navigation receiver positions itself or navigates using a local RTK system. Finally, the mobile satellite navigation receiver may operate in a combined mode in which the local RTK system is the primary source of position/velocity/time (PVT) information but a code navigation mode using the WADGPS system is running in the background. In this mode, the dual operation is used to learn the offset between a reference datum of the local RTK system and a reference datum of the WADGPS system. Once the offset is determined, it can be used to initialize the WADGPS floating ambiguity values and the long pull-in time can be avoided. Furthermore, once the offset is known within a specified accuracy, it allows the WADGPS position to be mapped to the same reference datum as the RTK solution. This allows the WADGPS system to be used to fill any holes in the availability of the RTK solution due to communication and/or distance problems.

While the mobile satellite navigation receiver is close to the RTK reference station and the communication link between the mobile satellite navigation receiver and the reference station is active, the mobile satellite navigation receiver uses the RTK system to position itself with respect to the reference station. (e.g., the reference station 120 in FIG. 1) Using the RTK system instead of the WADGPS system is advantageous because the RTK system is more accurate and the whole-cycle integer ambiguity can be quickly resolved.

Using the RTK system, the typical process is to take the measurements available from each satellite at both the mobile satellite navigation receiver (e.g., the user GPS receiver 140 in FIG. 1) and the associated reference GPS receiver (e.g., the GPS receiver 122 of the reference station 120 in FIG. 1). These measurements are then used to form a double difference of both the code and the carrier phase measurements. This double differencing across two satellites and two receivers substantially mitigates and/or cancels many of the systematic errors existing in the GPS measurements. The double differenced code and carrier phase observables in units of meters can be formed as:

$$\nabla \Delta P_i = \nabla \Delta \rho + \nabla \Delta T + \frac{\nabla \Delta I}{f_i^2} + \nabla \Delta O + \varepsilon_{\nabla \Delta P_i} \quad (14)$$

$$\lambda_i \nabla \Delta \phi_i = \nabla \Delta \rho + \nabla \Delta T - \frac{\nabla \Delta I}{f_i^2} + \nabla \Delta O + \lambda_i \cdot \nabla \Delta N_i + \varepsilon_{\nabla \Delta \phi_i} \quad (15)$$

where: the subscript i denotes the frequency (e.g., L1, L2 or L5); $P_i$ and $\phi_i$ are the code and carrier phase observables, respectively; $\nabla \Delta$ is the double difference operator; $\rho$ is the geometric distance from the satellite to the receiver; $\nabla \Delta T$ is the residual differential tropospheric bias, which may be represented as a function of the residual zenith tropospheric delay together with a mapping function which describes the dependence of the tropospheric delay on the elevation angle from the receiver to the satellite; $\nabla \Delta I$ is the double differential ionospheric bias; $\nabla \Delta O$ is the double differential orbital delay correction that may be obtained from a network RTK system or a wide area augmentation system (WAAS); $\lambda_i$ and $f_i$ are the wavelength and frequency of the i$^{th}$ carrier frequency, respectively; $\nabla \Delta N_i$ is the double difference integer ambiguity for the i$^{th}$ carrier frequency; and the terms $\varepsilon_{\nabla \Delta P_i}$ and $\varepsilon_{\nabla \Delta \phi_i}$ represent the code and phase errors, respectively, including random noise in the receivers and any unmodeled systematic errors, such as multipath, residual orbit errors, etc.

Linearization of the double differenced carrier phase observations can be represented by the following set of equations:

$$V = HX - Z \quad (16)$$

where: V is the post-fit residual vector at epoch k; Z is the prefit residuals, which are based on the double difference measurements for the current epoch; H is the design matrix; and X is the estimated state vector including three position components, residual ionospheric and tropospheric biases, and dual or triple frequency ambiguities. The values for the estimated state vector X are stored in Kalman filter states. In some embodiments, the Kalman filter includes a plurality of states, including but not limited to: three position states, each corresponding to a different direction or dimension; a residual tropospheric delay state; and N−1 residual ionospheric delay states. The Kalman filter state may optionally include three velocity states each corresponding to a different direction or dimension, and may optionally include three acceleration states each corresponding to a different direction or dimension. In some embodiments, the Kalman filter state includes N−1 L1 double differenced ambiguity states, and N−1 L2 double differenced ambiguity states, where N is the number of satellites from which measurements are obtained.

In some embodiments, information about the floating ambiguities is used to select those partial ambiguity combinations most likely to yield a successful search and results in an RTK PVT solution that is more accurate as a result of fixing the whole cycle ambiguities to the correct integer values. These embodiments are described in more detail in "Partial Search Carrier-Phase Integer Ambiguity Resolution" (U.S. patent application Ser. No. 12/119,450, filed on May 12, 2008), and "Distance Dependent Error Mitigation in Real-Time Kinematic (RTK) Positioning" (U.S. patent application Ser. No. 12/119,451, filed on May 12, 2008), both of which are incorporated by reference herein in their entirety.

In spite of its many advantages, the RTK system may not be available to the mobile satellite navigation receiver at all times because the mobile satellite navigation receiver may move to a location that is too far from a reference station of the RTK system or is out of sight of the reference station so that the communication link between the mobile satellite navigation receiver and the reference station cannot be maintained. In these situations, ionospheric induced error cannot be satisfactorily removed by taking into account the difference between measurements at the mobile satellite navigation receiver and reference station. This affects the above search process for the integer ambiguity vector because it causes an increase in the measurement residuals and the correct ambiguity becomes more difficult to determine.

Therefore, in situations where the local RTK system is not available or has lost its accuracy due to a large separation, the mobile satellite navigation receiver may need to operate in the WADGPS mode in which a different approach to resolving integer ambiguity is used. Using the WADGPS system, each whole-cycle ambiguity is estimated as a real-valued (non-integer) variable. This practice is often referred to as determining a "floating ambiguity" value. One technique for determining the "floating ambiguity" value involves the formation of refraction corrected code and carrier-phase measurements based on raw GPS measurements taken at the mobile satellite navigation receiver, the scaling of the carrier-phase measurements to the same units as the code measurements, and the subtraction of each scaled carrier-phase measurement from the corresponding code measurement to obtain an offset value. In some embodiments, the refraction-corrected code measurement, designated as $P_{RC}$, is formed as follows:

$$P_{RC} = \frac{f_1^2}{(f_1^2 - f_2^2)} P_1 - \frac{f_2^2}{(f_1^2 - f_2^2)} P_2 \cong P_1 - 1.5457(P_1 - P_2), \quad (17)$$

where $P_1$ and $P_2$ are the raw pseudorange code measurements on the L1 and L2 frequencies $f_1$ and $f_2$, respectively, at a particular measurement epoch. The refraction-corrected carrier-phase measurement, designated as $L_{RC}$, is formed similarly as follows:

$$L_{RC} = \frac{f_1^2}{(f_1^2 - f_2^2)} L_1 - \frac{f_2^2}{(f_1^2 - f_2^2)} L_2 \cong L_1 - 1.5457(L_1 - L_2), \quad (18)$$

where $L_1$ and $L_2$ are the carrier-phase measurements scaled by the wavelengths of the L1 and L2 signals, respectively, and each includes an approximate whole-cycle ambiguity value that has been added to cause the scaled carrier-phase measurement to be close to the same value as the corresponding code measurement. Thus, $$L_1 = (\phi_1 + N_1)\lambda_1, \quad (19)$$

$$L_2 = (\phi_2 + N_2)\lambda_2, \quad (20)$$

where $\phi_1$ and $\phi_2$ are the raw carrier phase measurement on the L1 and L2 frequencies, respectively, at the same measurement epoch, and the whole-cycle values of $N_1$ and $N_2$ have been initialized at the start of carrier-phase tracking by the mobile satellite navigation receiver to give values that are within one carrier wavelength of the corresponding code measurements so as to keep the differences between the scaled carrier-phase measurements and the corresponding code measurements small. From the form of equation (18), it is noted that the refraction corrected carrier-phase measurement includes a whole-cycle ambiguity with a wavelength $\lambda$ determined by the sum of $f_1$ and $f_2$ (which is about 2.803 GHz), so that $\lambda$ is approximately 0.107 meters (i.e., $c/(f_1+f_2)$).

Because the ionospheric effects have been removed from both the code and carrier-phase measurements according to Equations (17)-(20) and the effects of satellite clock and orbit errors on the pseudorange and carrier-phase measurements are the same, the values of $P_{RC}$ and $L_{RC}$ obtained should be almost identical except for the possible whole-cycle ambiguity associated with the carrier-phase measurement $L_{RC}$ and the higher multipath noise in the code measurement $P_{RC}$. This allows the resolution of the whole-cycle ambiguity in $L_{RC}$ by smoothing an offset ($O=P_{RC}-L_{RC}$) between the refraction corrected code measurement and the refraction corrected carrier-phase measurement across a series of measurement epochs so that the offset becomes an increasingly accurate estimate of the "floating ambiguity." The smoothed offset value can be further adjusted by using post-fix measurement residuals to provide an additional carrier-phase measurement adjustment such that the adjusted measurement residuals are near zero.

In some embodiments, the offset is smoothed by taking an expanding average of the offset as follows:

$$O_i = O_{i-1} + (P_{RC}^i - L_{RC}^i - O_{i-1})/\eta, \quad (21)$$

where $i=1, 2, 3, \ldots$, is used to designate a measurement epoch, and the value of $\eta$ is a confidence value that increases as $O_i$ becomes a more accurate estimate of the floating ambiguity value. In some embodiments, $\eta$ is equal to $i$ until a maximum value of averaging is attained. For example, if the carrier-phase measurement is assumed to have only $1/100^{th}$ of the noise of the code measurement, the value of "$\eta$" would be limited to less than 100 squared or 10,000. Equation (21) can thus be recursively computed until a predetermined accuracy of the floating ambiguity value is reached.

With the smoothed offset $O_i$, a smoothed refraction-corrected code measurement, $S$, can be obtained by adding the refraction corrected carrier-phase measurement for the current measurement epoch to the smoothed offset, so that $$S_i = O_i + L_i, \quad (22)$$

which has the accuracy of the carrier-phase measurement but without the associated ambiguities.

In some embodiments, the operations described with respect to equations (17)-(22) are performed for each of a plurality of satellites in view of the mobile satellite navigation receiver. With the smoothed refraction-corrected code measurement available for each of the plurality of satellites in view of the mobile satellite navigation receiver, the pseudoranges to these satellites may be obtained. These pseudoranges are adjusted with the WADGPS corrections received from the hubs and are used in a weighted least squares solution to calculate the state vector. This way, the position, velocity and time (PVT) of the mobile satellite navigation receiver can be computed as WADGPS solutions for the PVT of the mobile satellite navigation receiver.

Due to the different reference datum between the RTK system and the WADGPS system, the offset between the two systems needs to be known with the appropriate accuracy. Since the RTK system can use, as one option, a self-determined position of the RTK reference station, its offset to the WADGPS reference frame may be arbitrary. Thus, in order to combine the use of a RTK system and a WADGPS system, this offset needs to be determined at either the RTK reference station and/or at the mobile satellite navigation receiver. As described above, this offset may be obtained at the RTK reference station by subtracting RTK reference coordinates from WADGPS reference coordinates. This offset is then sent to a mobile satellite navigation receiver through a communication link. This approach can result in a quicker and better accuracy of the offsets, but it limits the application to only those RTK reference receivers that include a WADGPS system together with a special RTK protocol for this offset to be transmitted to the mobile satellite navigation receiver. In order to overcome the requirement for a special RTK reference receiver, some embodiments determine the offset vector at the mobile satellite navigation receiver.

The offset between the two coordinate frames may be obtained as follows. Two solutions are available at the mobile satellite navigation receiver. The RTK solution at the mobile satellite navigation receiver $X_{RTK}(t)$ is available from the RTK positioning system. In addition, the refraction-corrected pseudoranges adjusted by the WADGPS corrections received from the WADGPS hubs may be used in a weighted least squares solution to calculate a code solution $X_{Codenav}(t)$ from the WADGPS system based on Equation (17). These two solutions may be used to compute the position offset $DX(t)$ between the WADGPS code solution and the RTK solution in real time at the mobile satellite navigation receiver as shown in Equation (23). However, the accuracy of the offset vector may be noisy due to noise in the refraction-corrected code. Thus, to produce a stable offset value, some embodiments average the offset over a period of time. Equations (24)-(26) may be used in an intelligent averaging process to improve the accuracy of the offset on an epoch-by-epoch basis.

$$DX(t) = X_{Codenav}(t) - X_{RTK}(t) \quad (23)$$

$$COV^-(t) = COV^+(t-1) + q*dt \quad (24)$$

$$DX^+(t) = \frac{DX^+(t-1)*R2 + DX(t)*COV^-(t)}{COV^-(t) + R2} \quad (25)$$

$$COV^+(t) = \frac{COV^-(t)*R2}{COV^-(t) + R2} \quad (26)$$

In Equations (24)-(26), $COV^-(t)$ is the predicted variance for the offset at time t, q is the dynamic noise (e.g., q typically has values on the order of $10^{-8}$ to $10^{-9}$), $DX^+(t)$ is the smoothed offset at time t, R2 is the variance of the code navigation solution (e.g., the variance R2 is typically about a few meters or less, and can be derived from the weighted least squares solution in Equation (17)), $COV^+(t)$ is the estimated variance.

In some embodiments, the "floating ambiguity" values are solved as separate states in a least-squares or Kalman filter solution. When the ambiguities are included as states, the value for each floating ambiguity value is adjusted proportional to the variance so that it becomes increasingly accurate as the geometry of the system changes due to satellite motion.

Thus, these embodiments also yield an increasingly accurate estimate over time. (see "*Kinematic GPS for Differential Positioning: Resolving Integer Ambiguities on the Fly*," by Patrick H. C. Hwang, *Navigation* Vol. 38, No. 1, Spring 1991, which is incorporated herein by reference).

There are many combinations and variations of the above techniques which can be used to estimate the "floating ambiguity" values. However, all of them involve processing data over a significant time interval. The time interval can be as long as one or two hours before one can be confident that the "floating ambiguity" is accurate enough to yield an accuracy of less than (i.e., accuracy better than) 10 centimeters in the navigated position of the mobile satellite navigation receiver. To shorten the time interval for obtaining the "floating ambiguity" values, the WADGPS system can be initialized by use of a known location of the mobile satellite navigation receiver. A user input of the known position coordinates together with the associated covariance or a position and covariance obtained from an RTK position solution which has been adjusted by the previously determined datum offset can be used as virtual measurements. They can be processed in a standard Kalman filter, using the refraction corrected code and phase measurements of equations (17)-(18), to determine the floating ambiguities and avoid the long pull-in times otherwise required.

Figure 6:
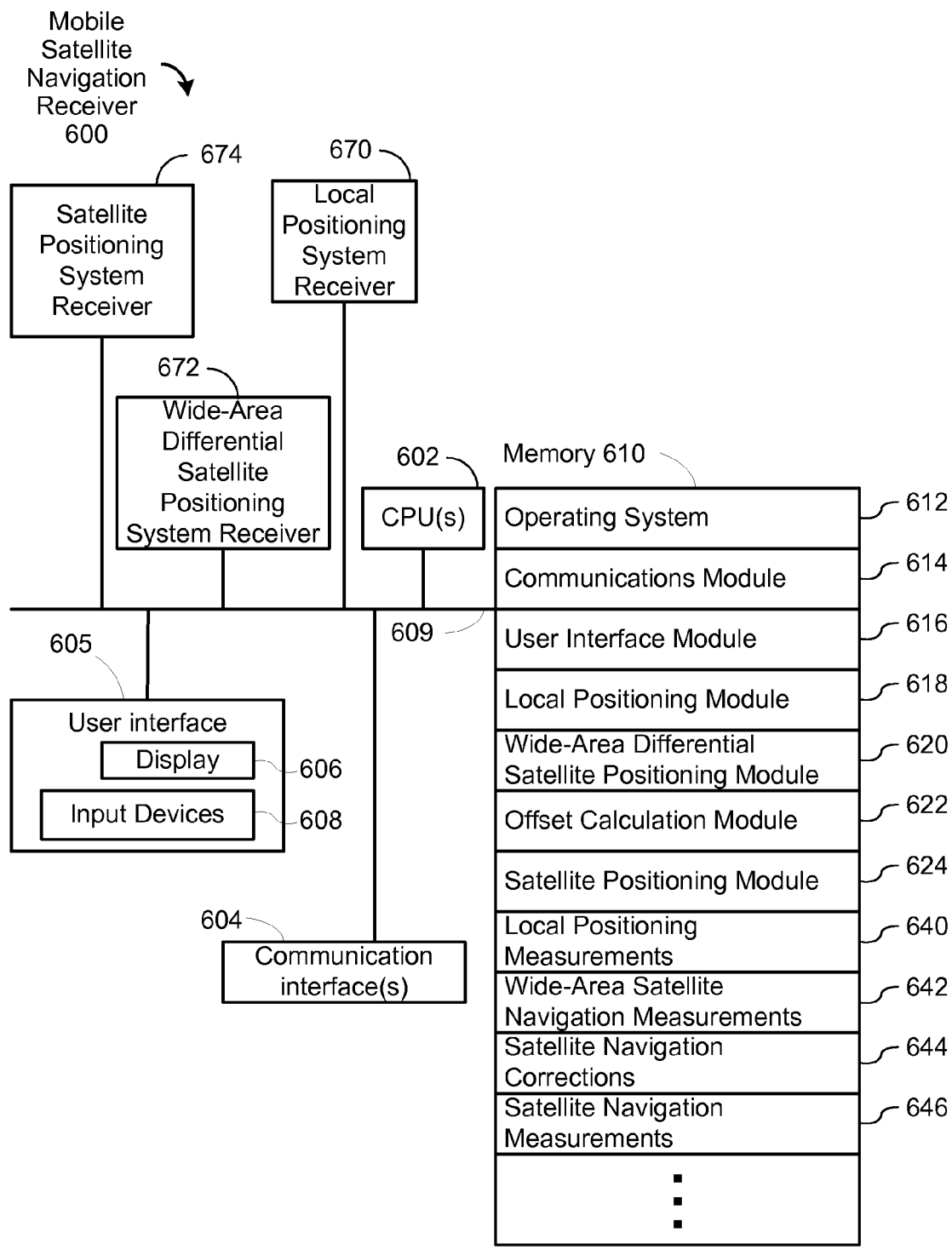
FIG. 6 is a block diagram illustrating a mobile satellite navigation receiver, according to some embodiments.

FIG. 6 is a block diagram illustrating a mobile satellite navigation receiver 600, according to some embodiments. The mobile satellite navigation receiver 600 can be the user GPS receiver 140 in FIG. 1. The mobile satellite navigation receiver 600 typically includes one or more processing units (CPU's) 602, one or more network or other communications interfaces 604, memory 610, a local positioning system receiver 670 (e.g., an RTK receiver), a wide-area differential satellite positioning system receiver 672 (e.g., a WADGPS receiver, etc.), a satellite positioning system receiver 674 (e.g., a GPS receiver, etc.), and one or more communication buses 609 for interconnecting these components. The communication buses 609 may include circuitry (sometimes called a chipset) that interconnects and controls communications between system components. The mobile satellite navigation receiver 600 optionally may include a user interface 605 comprising a display device 606 and input devices 608 (e.g., keyboard, mouse, touch screen, keypads, etc.). The memory 610 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 610 may optionally include one or more storage devices remotely located from the CPU(s) 602. The memory 610, or alternately the non-volatile memory device(s) within the memory 610, comprises a computer readable storage medium. In some embodiments, the memory 610 stores the following programs, modules and data structures, or a subset thereof:

- an operating system 612 that includes procedures for handling various basic system services and for performing hardware dependent tasks;
- a communication module 614 that is used for connecting the mobile satellite navigation receiver 600 to other computers, wide-area differential satellite positioning systems, local positioning systems, etc., via the one or more communication interfaces 604 (wired or wireless) and one or more communication networks, such as the Internet, other wide area networks, local area networks, metropolitan area networks, and so on;
- a user interface module 616 that receives commands from the user via the input devices 608, generates user interface objects in the display device 606, and/or displays maps, coordinates, routes, etc., related to the positioning of the mobile satellite navigation receiver 600;
- a local positioning module 618 that determines the position of the mobile satellite navigation receiver 600 based on data received by the local positioning system receiver 670 from a local positioning system, as described above;
- a wide-area differential satellite positioning module 620 that determines the position of the mobile satellite navigation receiver 600 based on data received by the wide-area differential satellite positioning system receiver 672 from a wide-area differential satellite positioning system, as described above;
- an offset calculation module 622 that calculates the offset between a reference datum of a local positioning system and a reference datum of a wide-area differential satellite positioning system, as described above;
- a satellite positioning module 624 that determines the position of the mobile satellite navigation receiver 600 based on data received by the satellite positioning system receiver 674 from a satellite positioning system, as described above;
- local positioning measurements 640 received by the local positioning system receiver 670 from a local positioning system;
- wide-area satellite navigation measurements 642 received by the wide-area differential satellite positioning system receiver 672 from a wide-area differential satellite positioning system;
- satellite navigation corrections 644 received by the wide-area differential satellite positioning system receiver 672 from a wide-area differential satellite positioning system; and
- satellite navigation measurements 646 received by the satellite positioning system receiver 674 from a satellite positioning system.

Each of the above identified elements may be stored in one or more of the previously mentioned memory devices, and corresponds to a set of instructions for performing a function described above. The set of instructions can be executed by one or more processors (e.g., the CPUs 602). The above identified modules or programs (i.e., sets of instructions) need not be implemented as separate software programs, procedures or modules, and thus various subsets of these modules may be combined or otherwise re-arranged in various embodiments. In some embodiments, the memory 610 may store a subset of the modules and data structures identified above. Furthermore, the memory 610 may store additional modules and data structures not described above.

Although FIG. 6 shows a "mobile satellite navigation receiver," FIG. 6 is intended more as functional description of the various features which may be present in a mobile satellite navigation receiver than as a structural schematic of the embodiments described herein. In practice, and as recognized by those of ordinary skill in the art, items shown separately could be combined and some items could be separated.

Figure 7:
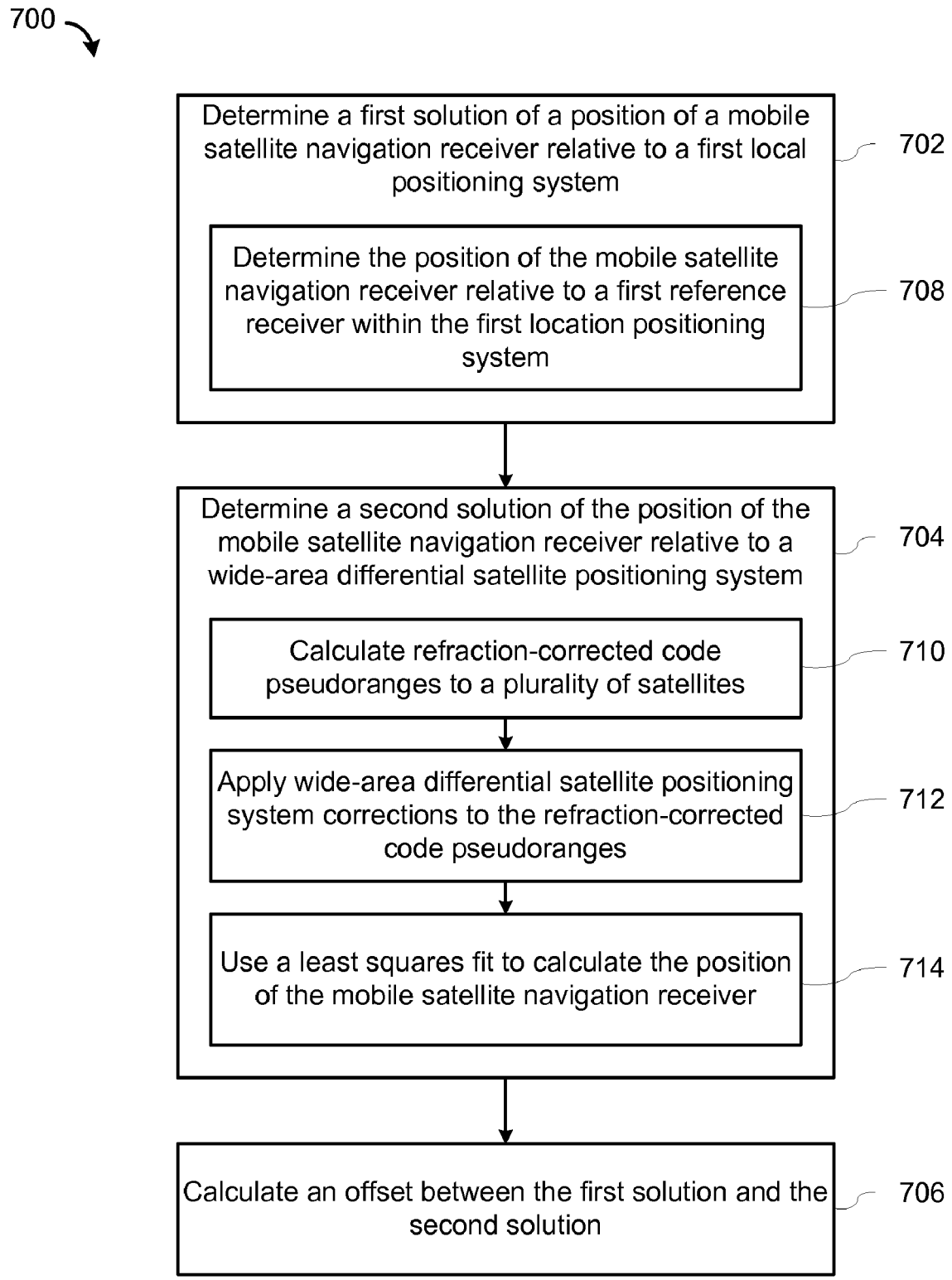
FIG. 7 is a flowchart representing a method for calculating an offset between a local positioning system and a wide-area differential satellite positioning system, according to some embodiments.

FIG. 7 is a flowchart representing a method 700 for calculating an offset between a local positioning system and a wide-area differential satellite positioning system, according to some embodiments. The method 700 may be governed by instructions that are stored in a computer readable storage medium and that are executed by one or more processors of one or more servers. Each of the operations shown in FIG. 7 may correspond to instructions stored in a computer memory or computer readable storage medium. The computer readable storage medium may include a magnetic or optical disk storage device, solid state storage devices such as flash memory, or other non-volatile memory device or devices. The computer readable instructions stored on the computer readable storage medium are in source code, assembly language code, object code, or other instruction format that is interpreted by one or more processors.

The method 700 begins when a mobile satellite navigation receiver determines (702) a first solution of a position of the mobile satellite navigation receiver relative to a first local positioning system, wherein the first local positioning system includes one or more reference receivers at known locations. In some embodiments, the mobile satellite navigation receiver determines (708) the position of the mobile satellite navigation receiver relative to a first reference receiver within the first local positioning system. In some embodiments, the first reference receiver does not determine the position of the first reference receiver relative to the wide-area differential satellite positioning system.

In some embodiments, the first local positioning system includes a real-time kinematic (RTK) positioning system. In these embodiments, the first solution is a RTK solution.

The mobile satellite navigation receiver determines (704) a second solution of the position of the satellite navigation receiver relative to a wide-area differential satellite positioning system. In some embodiments, the mobile satellite navigation receiver determines the second solution by calculating (710) refraction-corrected code pseudoranges to a plurality of satellites, applying (712) wide-area differential satellite positioning system corrections to the refraction-corrected code pseudoranges, and using (714) a least squares solution to calculate the position of the mobile satellite navigation receiver.

In some embodiments, the wide-area differential satellite positioning system includes a wide-area differential global positioning system (WADGPS). In these embodiments, the second solution is a WADGPS solution. In some embodiments, the wide-area differential satellite positioning system includes a wide-area differential GLONASS positioning system. In these embodiments, the second solution is a wide-area differential GLONASS positioning system solution. In some embodiments, the wide-area differential satellite positioning system includes a wide-area differential Galileo positioning system. In these embodiments, the second solution is a wide-area differential Galileo positioning system solution.

The mobile satellite navigation receiver then calculates (706) an offset between the first solution and the second solution. In some embodiments, the offset is averaged over a specified time period. In some embodiments, the mobile satellite navigation receiver stores the offset in a memory of the mobile satellite navigation receiver (e.g., the memory 610).

In some embodiments, the mobile satellite navigation receiver operates in a first mode, including determining a position of the mobile satellite navigation receiver relative to the first local positioning system. The mobile satellite navigation receiver may then apply the offset to the position of the mobile satellite navigation receiver relative to the first local positioning system to determine the position of the mobile satellite navigation receiver relative to the wide-area differential satellite positioning system. The mobile satellite navigation receiver may also use the offset to initialize floating ambiguities that are used in a wide-area differential satellite positioning system mode, wherein during operation in the wide-area differential satellite positioning system mode, the position of the mobile satellite navigation receiver is determined relative to the wide-area differential satellite positioning system.

In some embodiments, the mobile satellite navigation receiver operates in a wide-area differential satellite positioning system mode and determines the position of the mobile satellite navigation receiver relative to the wide-area differential satellite positioning system.

Each of the methods described herein may be governed by instructions that are stored in a computer readable storage medium and that are executed by one or more processors of one or more servers or clients. Each of the operations shown in FIGS. 3-4 and 7 may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   at a single mobile satellite navigation receiver,
      determining a first solution of a position of the single mobile satellite navigation receiver relative to a first local positioning system, wherein the first local positioning system includes one or more reference receivers at known locations;
      determining a second solution of the position of the single mobile satellite navigation receiver relative to a wide-area differential satellite positioning system; and
   calculating an offset between the first solution and the second solution.

2. The method of claim 1,
   wherein the first local positioning system includes a real-time kinematic (RTK) positioning system; and
   wherein the first solution is a RTK solution.

3. The method of claim 1,
   wherein the wide-area differential satellite positioning system includes a wide-area differential global positioning system (WADGPS); and
   wherein the second solution is a WADGPS solution.

4. The method of claim 1,
   wherein the wide-area differential satellite positioning system includes a wide-area differential GLONASS positioning system; and
   wherein the second solution is a wide-area differential GLONASS positioning system solution.

5. The method of claim 1,
   wherein the wide-area differential satellite positioning system includes a wide-area differential Galileo positioning system; and
   wherein the second solution is a wide-area differential Galileo positioning system solution.

6. The method of claim 1, including storing the offset at the mobile satellite navigation receiver.

7. The method of claim 1, wherein determining the first solution of a position of the single mobile satellite navigation receiver relative to the first local positioning system includes determining, at the single mobile satellite navigation receiver, the position of the single mobile satellite navigation receiver relative to a first reference receiver within the first local positioning system.

8. The method of claim 7, wherein the first reference receiver does not determine the position of the first reference receiver relative to the wide-area differential satellite positioning system.

9. The method of claim 1, wherein determining the second solution of the position of the single mobile satellite navigation receiver relative to the wide-area differential satellite positioning system includes:
- calculating refraction-corrected code pseudoranges to a plurality of satellites;
- applying wide-area differential satellite positioning system corrections to the refraction-corrected code pseudoranges; and
- using a least squares solution to calculate the position of the single mobile satellite navigation receiver.

10. The method of claim 1, wherein the offset is averaged over a specified time period.

11. The method of claim 1, including:
- operating the single mobile satellite navigation receiver in a first mode, including determining a position of the single mobile satellite navigation receiver relative to the first local positioning system.

12. The method of claim 11, including, at the single mobile satellite navigation receiver, applying the offset to the position of the single mobile satellite navigation receiver relative to the first local positioning system to determine the position of the single mobile satellite navigation receiver relative to the wide-area differential satellite positioning system.

13. The method of claim 11, including, at the single mobile satellite navigation receiver, using the offset to initialize floating ambiguities that are used in a wide-area differential satellite positioning system mode, wherein during operation in the wide-area differential satellite positioning system mode, the position of the single mobile satellite navigation receiver is determined relative to the wide-area differential satellite positioning system.

14. The method of claim 13, including:
- operating the single mobile satellite navigation receiver in a wide-area differential satellite positioning system mode; and
- determining, at the single mobile satellite navigation receiver, the position of the single mobile satellite navigation receiver relative to the wide-area differential satellite positioning system.

15. A single mobile satellite navigation receiver, comprising:
- a signal receiver for receiving navigation satellite signals;
- memory;
- one or more processors; and
- one or more programs stored in the memory, the one or more programs comprising instructions to:
  - determine a first solution of a position of the single mobile satellite navigation receiver relative to a first local positioning system, wherein the first local positioning system includes one or more reference receivers at known locations;
  - determine a second solution of the position of the single mobile satellite navigation receiver relative to a wide-area differential satellite positioning system; and
  - calculate an offset between the first solution and the second solution.

16. The single mobile satellite navigation receiver of claim 15,
- wherein the first local positioning system includes a real-time kinematic (RTK) positioning system; and
- wherein the first solution is a RTK solution.

17. The single mobile satellite navigation receiver of claim 15,
- wherein the wide-area differential satellite positioning system includes a wide-area differential global positioning system (WADGPS); and
- wherein the second solution is a WADGPS solution.

18. The single mobile satellite navigation receiver of claim 15,
- wherein the wide-area differential satellite positioning system includes a wide-area differential GLONASS positioning system; and
- wherein the second solution is a wide-area differential GLONASS positioning system solution.

19. The single mobile satellite navigation receiver of claim 15,
- wherein the wide-area differential satellite positioning system includes a wide-area differential Galileo positioning system; and
- wherein the second solution is a wide-area differential Galileo positioning system solution.

20. The single mobile satellite navigation receiver of claim 15, wherein the one or more programs include instructions to store the offset at the single mobile satellite navigation receiver.

21. The single mobile satellite navigation receiver of claim 15, wherein the instructions to determine a position of the single mobile satellite navigation receiver relative to the first local positioning system include instructions to determine, at the single mobile satellite navigation receiver, the position of the single mobile satellite navigation receiver relative to a first reference receiver within the first local positioning system.

22. The single mobile satellite navigation receiver of claim 21, wherein the first reference receiver does not determine the position of the first reference receiver relative to the wide-area differential satellite positioning system.

23. The single mobile satellite navigation receiver of claim 15, wherein the instructions to determine the second solution of the position of the single mobile satellite navigation receiver relative to the wide-area differential satellite positioning system include instructions to:
- calculate refraction-corrected code pseudoranges to a plurality of satellites;
- apply wide-area differential satellite positioning system corrections to the refraction-corrected code pseudoranges; and
- use a least squares solution to calculate the position of the single mobile satellite navigation receiver.

24. The single mobile satellite navigation receiver of claim 15, wherein the offset is averaged over a specified time period.

25. The single mobile satellite navigation receiver of claim 15, wherein the one or more programs include instructions to operate the single mobile satellite navigation receiver in a first mode, which include instructions to determine a position of the single mobile satellite navigation receiver relative to the first local positioning system.

26. The single mobile satellite navigation receiver of claim 25, wherein the one or more programs include instructions to apply the offset to the position of the single mobile satellite navigation receiver relative to the first local positioning system to determine the position of the single mobile satellite navigation receiver relative to the wide-area differential satellite positioning system.

27. The single mobile satellite navigation receiver of claim 25, wherein the one or more programs include instructions to use the offset to initialize floating ambiguities that are used in a wide-area differential satellite positioning system mode, wherein during operation in the wide-area differential satellite positioning system mode, the position of the single mobile satellite navigation receiver is determined relative to the wide-area differential satellite positioning system.

28. The single mobile satellite navigation receiver of claim 27, wherein the one or more programs include instructions to:
- operate the single mobile satellite navigation receiver in a wide-area differential satellite positioning system mode; and
- determine, at the single mobile satellite navigation receiver, the position of the single mobile satellite navigation receiver relative to the wide-area differential satellite positioning system.

29. A computer readable storage medium storing one or more programs configured for execution by one or more processors in a single mobile satellite navigation receiver, the one or more programs comprising instructions to:
- determine a first solution of a position of the single mobile satellite navigation receiver relative to a first local positioning system, wherein the first local positioning system includes one or more reference receivers at known locations;
- determine a second solution of the position of the single mobile satellite navigation receiver relative to a wide-area differential satellite positioning system; and
- calculate an offset between the first solution and the second solution.

* * * * *